(12) United States Patent
Choi et al.

(10) Patent No.: US 9,379,824 B2
(45) Date of Patent: Jun. 28, 2016

(54) APPARATUS AND METHOD FOR INTERFACING BETWEEN CENTRAL PROCESSING UNIT AND MAIN MEMORY UNIT

(71) Applicant: ELECTRONICS AND TELECOMMUNICATIONS RESEARCH INSTITUTE, Daejeon (KR)

(72) Inventors: Yong-Seok Choi, Daejeon (KR); Hyuk-Je Kwon, Daejeon (KR); Gyung-Ock Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/551,826

(22) Filed: Nov. 24, 2014

(65) Prior Publication Data
US 2015/0180574 A1 Jun. 25, 2015

(30) Foreign Application Priority Data
Dec. 19, 2013 (KR) .......................... 10-2013-0159058

(51) Int. Cl.
*H04B 10/80* (2013.01)
(52) U.S. Cl.
CPC .................................. *H04B 10/801* (2013.01)
(58) Field of Classification Search
CPC .......... G02B 6/12; G02B 6/26; G06F 15/173; H04B 10/801; H04B 10/802; H04B 10/803
USPC ............................ 398/115; 385/14; 711/118
See application file for complete search history.

(56) References Cited

U.S. PATENT DOCUMENTS

| | | | | |
|---|---|---|---|---|
| 5,349,653 A * | 9/1994 | Kurokawa | ............... | H03M 9/00 341/101 |
| 6,112,287 A * | 8/2000 | Litaize | ............... | G06F 12/0813 712/11 |
| 6,651,139 B1 * | 11/2003 | Ozeki | ............... | G06F 12/084 711/113 |
| 2013/0064496 A1 * | 3/2013 | Suh | ............... | G02B 6/12007 385/14 |

FOREIGN PATENT DOCUMENTS

| | | |
|---|---|---|
| KR | 10-2012-0027209 | 3/2012 |
| KR | 10-2013-0028563 | 3/2013 |
| WO | WO 2010/126463 A1 | 11/2010 |

* cited by examiner

*Primary Examiner* — Dalzid Singh
(74) *Attorney, Agent, or Firm* — Staas & Halsey LLP

(57) ABSTRACT

Disclosed are an apparatus and method for interfacing between a central processing unit (CPU) and a main memory unit, whereby a shared cache memory unit and the main memory unit are connected to each other using one optical signal transmission line. The apparatus for interfacing between the CPU and the main memory unit includes: a master optical connection protocol engine, converting operation control signals received from a shared cache memory unit of the CPU into serial signals; a first electrical-to-optical (E/O) converter, converting the serial signals converted by the master optical connection protocol engine into optical signals; a second E/O converter, converting the optical signals converted by the first E/O converter into serial signals; a slave optical connection protocol engine, converting the serial signals converted by the second E/O converter into operation control signals; and a memory controller having access to the main memory unit.

20 Claims, 23 Drawing Sheets

APPARATUS AND METHOD FOR INTERFACING BETWEEN CENTRAL PROCESSING UNIT AND MAIN MEMORY UNIT

CROSS REFERENCE TO RELATED APPLICATION(S)

This application claims the benefit of Korean Patent Application No. 10-2013-0159058, filed Dec. 19, 2013, which is hereby incorporated by reference in its entirety into this application.

BACKGROUND OF THE INVENTION

1. Technical Field

The present invention relates generally to an apparatus for interfacing between a central processing unit (CPU) and a main memory unit and, more particularly, to an apparatus for interfacing between a CPU and a main memory unit, whereby data is transmitted between the CPU and the main memory unit by using optical signals; and a method for interfacing between a CPU and a main memory unit using the same.

2. Description of the Related Art

As well known to those skilled in the art, a system based on a microprocessor identified as a central processing unit (CPU), such as a computer system or a communication system, requires a large number of main memory units 20 that are capable of performing a high-speed operation for data processing.

FIG. 1 is a view of a configuration of an apparatus for interfacing between a CPU 10 and a main memory unit 20 according to the related art. In general, the CPU 10 may include one to eight cores 11, and in FIG. 1, the CPU 10 includes four cores 11.

The CPU 10 includes a plurality of cores 11 that perform an arithmetic operation. In this case, each of the plurality of cores 11 is connected to an individual cache memory unit 12.

The individual cache memory unit 12 is interfaced with a shared cache memory unit 13, and since the number of cores 11 of the CPU 10 is four, the number of interfaces between the individual cache memory unit 12 and the shared cache memory unit 13 is four.

The shared cache memory unit 13 is interfaced with the main memory unit 20 by using a memory controller 14 and transmits/receives data to/from the main memory unit 20. The shared cache memory unit 13 transmits/receives data to/from a peripheral device, for example, an auxiliary memory unit or an input/output unit, by using a peripheral device input/output controller 15.

In the related art, memory using a double data rate (DDR) method is mainly used as the main memory unit 20 for large-capacity and high-speed processing. The memory used as the main memory unit 20 selects an interface having a signal transmission line of 32-bit or 64-bit, in terms of a data width, as an interface with the memory controller 14 embedded in a CPU for a high-speed operation.

Also, the memory used as the main memory unit 20 is connected to an interface having a signal transmission line of 40-bit or more for address and control information and thus requires 100 or more signal transmission lines. In this case, since the signal transmission lines require a high-speed operation, an operation of 400 MHz is required in the oldest version using the DDR method, and DDR4 that is currently standardized and the latest DDR method requires a high-speed operation up to 3200 MHz.

A coupling shape of the memory controller 14 and the main memory unit 20 is referred to as a channel, and in an initial DDR method, four memories can be coupled to each channel, but in the latest high-speed DDR method, only one memory can be coupled to each channel.

Since the amount of memory required for high-performance computing, such as a need for current big data processing, is enormously increased, in the related art, there are attempts for increasing available memory by adopting a method of increasing the capacity of the main memory unit 20 itself or increasing the number of channels.

However, there is a limitation in increasing the capacity of memory, because a process does not make advance any more according to Moore's Law and Hwang's Law based on development in process.

In addition, increasing the number of channels has also a limitation in the size of a die, because the number of interfaces between the memory controller 14 and the main memory unit 20 is large, as described above.

In addition, since signal transmission lines between the memory controller 14 and the main memory unit 20 should be disposed as close as possible due to crosstalk in each signal transmission line and the amount of power consumption, due to the size of the CPU 10 and the size of the main memory unit 20, as the number of channels is increased, there is a limitation in disposing several channels to be close to one another such that only two or three channels can be expanded at the present point in time.

In this way, since there is a limitation in increasing the capacity of memory per main memory unit 20, in order to fundamentally solve this limitation, a method of increasing the number of channels of the CPU 10 by reducing the number of signal transmission lines itself without any limitation is most preferable.

FIG. 2 is a view of the apparatus for interfacing between the memory controller 14 and the main memory unit 20 illustrated in FIG. 1 according to the related art, so as to reduce the number of signal transmission lines. In FIG. 2, an electrical-to-optical (E/O) converter 40 is disposed in the middle of the memory controller 14 and the main memory unit 20 instead of directly connecting the memory controller 14 and the main memory unit 20. Thus, electrical signals are transmitted between the memory controller 14 and the E/O converter 40 instead of directly transmitting/receiving electrical signals. In this case, optical signals are transmitted between two E/O converters 40, and electrical signals are transmitted between the E/O converter 40 and the main memory unit 20. Thus, a limitation in arrangement that occurs due to the size of the CPU 10 and the main memory unit 20, among the above-mentioned limitations can be solved. However, a difficulty in increasing the number of channels that occurs due to the die size of the main memory unit 10 is not solved yet.

FIG. 3 is a view of the apparatus for interfacing between the memory controller 14 and the main memory unit 20 illustrated in FIG. 1 according to the related art, so as to reduce the number of signal transmission lines. An E/O converter 16 of the CPU 10 illustrated in FIG. 3 converts signal transmission lines that are generated in the memory controller 14 into optical signals (E/O), and an optical multiplexing unit (OMUX) 17 multiplexes the optical signals and transmits the multiplexed optical signals to the main memory unit 20. Thus, an OMUX unit 21 of the main memory unit 20 separates the multiplexed optical signals received from the CPU 10 from the signal transmission lines connected to a memory cell 23, and an optical-to-electrical (O/E) converter 22 converts the optical signals into electrical signals (O/E) and transmits the optical signals into the memory cell 23.

The main memory unit 20 converts signal transmission lines generated in the memory cell 23 into optical signals by using an E/O converter 24 and multiplexes the optical signals and transmits the multiplexed optical signals to the memory controller 14 by using an OMUX unit 25. Thus, an OMUX unit 18 of the CPU 10 separates the multiplexed optical signals received from the main memory unit 20 from the signal transmission lines connected to the memory controller 14, and an O/E converter 19 converts the optical signals into electrical signals and transmits the optical signals to the memory controller 14. In this case, since 100 or more signal transmission lines of the memory controller 14 are present, 100 or more E/O converters 16 and 24 or O/E converters 19 and 22 are required to convert signals of the signal transmission lines into optical signals such that there is a limitation in the area of the CPU 10. Since there is a limitation in multiplexing 100 optical signals in current technology, it is difficult to implement this multiplexing, and there is a limitation in applying this multiplexing to current high-speed memory.

Also, since the number of signal transmission lines is large, problems may occur in data transmission/reception due to skew that occurs in the signal transmission lines. However, since no method of aligning signal transmission lines is present in the above related art, precise measurement and implementation is required in a board not to be affected by an operational environment, and the length of optical signal transmission lines is limited.

Optical communication has been already applied to communication equipment so as to correspond to an increase in a data amount and high-speed. In optical communications used in communication equipment, skew compensation between signal transmission lines is possible, and safe data transmission/reception is guaranteed.

Thus, in order to overcome the above-described limitations in interfacing between the memory controller 14 and the main memory unit 20, it is preferable to apply algorithms used in communication.

However, optical communication used in the communication equipment is limited to communication protocols and is not designed to be suitable for access to memory and has many delay times and thus cannot be applied to memory access that requires a fast response time. In connection with this, Korean Patent Publication No. 10-2012-0027209 discloses a technology related to "Optical Memory Expansion" and Korean Patent Publication No. 10-2013-0028563 discloses a technology related to "Optical Connection Apparatus, Method of Manufacturing the Same, and Memory System including the Optical Connection Apparatus"

SUMMARY OF THE INVENTION

Accordingly, the present invention has been made keeping in mind the above problems occurring in the prior art, and an object of the present invention is to provide an apparatus and method for interfacing between a central processing unit (CPU) and a main memory unit, whereby a shared cache memory unit and the main memory unit that receive operation control signals from a plurality of cores, are connected to each other by using one optical signal transmission line.

In order to accomplish the above object, the present invention provides an apparatus for interfacing between a central processing unit (CPU) and a main memory unit, the apparatus including: a master optical connection protocol engine configured to convert operation control signals received from a shared cache memory unit of the CPU into serial signals; a first electrical-to-optical (E/O) converter configured to convert the serial signals converted by the master optical connection protocol engine into optical signals; a second E/O converter configured to convert the optical signals converted by the first E/O converter into serial signals; a slave optical connection protocol engine configured to convert the serial signals converted by the second E/O converter into operation control signals; and a memory controller configured to access to the main memory unit based on the operation control signals converted by the slave optical connection protocol engine.

The memory controller may generate response signals based on a result of having access to the main memory unit according to the operation control signals, and the slave optical connection protocol engine may convert parallel signals converted by the memory controller into serial signals, and the second E/O converter may convert the serial signals converted by the slave optical connection protocol engine into optical signals, and the first E/O converter may convert the optical signals converted by the second E/O converter into serial signals, and the master optical connection protocol engine may convert the serial signals converted by the first E/O converter into parallel signals and may transmit the parallel signals to the shared cache memory unit.

The master optical connection protocol engine may include: a first packet generation module configured to generate a packet header and packet data based on the operation control signals received from the shared cache memory unit; a packet transmission header buffer module configured to store the packet header generated by the first packet generation module; a packet transmission data buffer module configured to store the packet data generated by the first packet generation module; a packet sequence and cyclic redundancy code (CRC) generation module configured to generate a packet sequence and a CRC based on the packet header and the packet data and generating operation control packets by connecting the packet header, the packet data, the packet sequence and the CRC; and a first packet data serialization module configured to convert the operation control packets into serial signals and transmitting the serial signals to the first E/O converter.

The master optical connection protocol engine may include: a first packet data parallelization module configured to receive status information of buffer modules of the slave optical connection protocol engine as serial signals from the first E/O converter and converts the serial signals into parallel signals; a packet checking module configured to manage the status information of the buffer modules of the slave optical connection protocol engine based on the parallel signals and manage status information of buffer modules of the master optical connection protocol engine; a first packet generation module, if operation control signals are received from the shared cache memory unit, configured to determine whether redundant spaces are present in the buffer modules of the slave optical connection protocol engine and the buffer modules of the master optical connection protocol engine, based on the status information of the buffer modules of the slave optical connection protocol engine and the status information of the buffer modules of the master optical connection protocol engine and if redundant spaces are present in the buffer modules of the slave optical connection protocol engine and the buffer modules of the master optical connection protocol engine, generate a packet header based on the operation control signals and store the generated packet header in the buffer modules of the master optical connection protocol engine; a packet sequence and CRC generation module configured to generate a packet sequence and a CRC based on the packet header and the operation control signals and generate packets by connecting the packet sequence, the CRC, the packet header, and the operation control signals; and a first packet data serialization module configured to convert the packets into serial signals and transmitting the serial signals to the first E/O converter.

The first packet data parallelization module may receive response signals with respect to the serial signals from the first E/O converter and may convert the response signals into parallel signals, and the packet checking module may generate packet reception information based on the parallel signals, and the packet sequence and CRC generation module may determine whether the parallel signals are normally received, based on the packet reception information and may generate normally-received signals or reception error signals, and the first packet data serialization module may convert the normally-received signals or the reception error signals into serial signals and may transmit the serial signals to the first E/O converter.

The packet checking module may store the packet header and the packet data included in response signals in buffer modules based on the parallel signals received from the slave optical connection protocol engine, and the packet translation module may detect the stored packet header, may detect the packet data based on the packet header, and may transmit the detected packet header and the detected packet data to the shared cache memory unit.

The slave optical connection protocol engine may include: a second packet data parallelization module configured to convert the serial signals received from the second E/O converter into parallel signals; and a packet checking and translation module configured to determine whether the parallel signals are normally received and redundantly received, based on the packet sequence and CRC included in the converted parallel signals and transmitting the parallel signals that are not redundantly received, among the normally-received parallel signals to the memory controller.

The packet checking and translation module may receive response signals with respect to the operation control signals from the memory controller, and the slave optical connection protocol engine may further include a second packet data serialization module configured to convert the response signals into serial signals and transmitting the serial signals to the second E/O converter.

The slave optical connection protocol engine may include: a second packet data parallelization module configured to convert the serial signals received from the second E/O converter into parallel signals; a packet checking and translation module configured to determine whether the operation control signals are normally received and redundantly received, based on the converted parallel signals and transmitting the operation control signals that are not redundantly received, among the normally-received operation control signals to the memory controller; a second packet reception data buffer module configured to receive data corresponding to the transmitted operation control signals from the memory controller and store the received data; a second packet generation module configured to generate a packet sequence and a packet header based on the data stored in the second packet reception data buffer module, generate CRC based on the packet sequence, the packet header, and the data and generating response signals; and a second packet data serialization module configured to convert the response signals generated by the second packet generation module into serial signals and transmit the serial signals to the second E/O converter.

The packet checking and translation module may generate packet reception information based on the parallel signals received from the second E/O converter, and the second packet generation module may check whether the parallel signals are normally received, based on the packet reception information and may generate retransmission request signals of the response signals if an error occurs in receiving the parallel signals, and the second packet data serialization module may convert the retransmission request signals into serial signals and may transmit the serial signals to the second E/O converter.

In order to accomplish the above object, the present invention also provides a method for interfacing between a central processing unit (CPU) and a main memory unit, the method including: converting operation control signals received from a shared cache memory unit of the CPU into serial signals by a master optical connection protocol engine; converting the serial signals converted by the master optical connection protocol engine into optical signals by a first electrical-to-optical (E/O) converter; converting the optical signals converted by the first E/O converter into serial signals by a second E/O converter; converting the serial signals converted by the second E/O converter into operation control signals by a slave optical connection protocol engine; and having access to the main memory unit based on the operation control signals converted by the slave optical connection protocol engine by a memory controller.

The method may further include: generating response signals based on a result of having access to the main memory unit according to the operation control signals by the memory controller; converting parallel signals converted by the memory controller into serial signals by the salve optical connection protocol engine; converting the serial signals converted by the slave optical connection protocol engine into optical signals by the second E/O converter; converting the optical signals converted by the second E/O converter into serial signals by the first E/O converter; and converting the serial signals converted by the first E/O converter into parallel signals and transmitting the parallel signals to the shared cache memory unit by the master optical connection protocol engine.

The converting of the operation control signals into serial signals may include: generating a packet header and packet data based on the operation control signals received from the shared cache memory unit by the master optical connection protocol engine; generating a packet sequence and a cyclic redundancy code (CRC) based on the packet header and the packet data by the master optical connection protocol engine; generating operation control packets by connecting the packet header, the packet data, the packet sequence, and the CRC by the master optical connection protocol engine; and converting the operation control packets into serial signals and transmitting the serial signals to the first E/O converter by the master optical connection protocol engine.

The method may further include: converting the serial signals received from the second E/O converter into parallel signals by the slave optical connection protocol engine; determining whether the parallel signals are normally received and redundantly received, based on the packet sequence and CRC included in the parallel signals by the slave optical connection protocol engine; and transmitting the parallel signals that are determined not to be redundantly received, among the parallel signals determined to be normally received in the determination, to the memory controller by the salve optical connection protocol engine.

The method may further include: receiving response signals with respect to the serial signals from the memory controller by the slave optical connection protocol engine; and converting the response signals into serial signals and transmitting the serial signals to the second E/O converter by the slave optical connection protocol engine.

The method may further include: managing status information of buffer modules of the slave optical connection protocol engine and status information of buffer modules of the master optical connection protocol engine by the master optical connection protocol engine; if the operation control signals are received from the shared cache memory unit, determining whether redundant spaces are present in the buffer modules of the slave optical connection protocol engine and the buffer modules of the master optical connection protocol engine, based on the status information of buffer modules of the slave optical connection protocol engine and the status information of buffer modules of the master optical connection protocol engine, by the master optical connection protocol engine; if it is determined that redundant spaces are present in the buffer modules of the slave optical connection protocol engine and the buffer modules of the master optical connection protocol engine, generating a packet header based on the operation control signals and storing the packet header in the buffer modules of the master optical connection protocol engine, by the master optical connection protocol engine; generating a packet sequence and a CRC based on the packet header and the operation control signals by the master optical connection protocol engine; generating packets by connecting the packet sequence, the CRC, the packet header, and the operation control signals, by using the master optical connection protocol engine; and converting the packets into serial signals and transmitting the serial signals to the first E/O converter by the master optical connection protocol engine.

The method may further include: receiving response signals with respect to the serial signals from the first E/O converter and converting the response signals into parallel signals by the master optical connection protocol engine; generating packet reception information based on the parallel signals by the master optical connection protocol engine; determining whether the parallel signals are normally received, based on the packet reception information and generating normally-received signals or reception error signals by using the master optical connection protocol engine; and converting the normally-received signals or the reception error signals into serial signals and transmitting the serial signals to the first E/O converter by the master optical connection protocol engine.

The method may further include: storing the packet header and the packet data included in response signals in buffer modules based on the parallel signals received from the slave optical connection protocol engine by the master optical connection engine; detecting the stored packet header by the master optical connection protocol engine; and detecting the packet data based on the packet header and transmitting the detected packet header and the detected packet data to the shared cache memory unit by the master optical connection protocol engine.

The converting of the serial signals converted by the second E/O converter into operation control signals may include: converting the serial signals received from the second E/O converter into parallel signals by the slave optical connection protocol engine; determining whether the operation control signals are normally received and redundantly received, based on the converted parallel signals by the slave optical connection protocol engine; transmitting the operation control signals that are determined not to be redundantly received, among the normally-received operation control signals in the determination, to the memory controller by the slave optical connection protocol engine; receiving data corresponding to the transmitted operation control signals from the memory controller and storing the received data by the slave optical connection protocol engine; generating a packet sequence and a packet header based on the stored data by the slave optical connection protocol engine; generating CRC based on the packet sequence, the packet header, and the data and generating response signals by the slave optical connection protocol engine; and converting the response signals into serial signals and transmitting the serial signals to the second E/O converter by the slave optical connection protocol engine.

The method may further include: generating packet reception information based on the parallel signals received from the second E/O converter by the slave optical connection protocol engine; checking whether the parallel signals are normally received, based on the packet reception information by the slave optical connection protocol engine; generating retransmission request signals of the response signals if an error occurs in receiving the parallel signals in the checking of whether the parallel signals are normally received, by the slave optical connection protocol engine; and converting the retransmission request signals into serial signals and transmitting the serial signals to the second E/O converter by the slave optical connection protocol engine.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
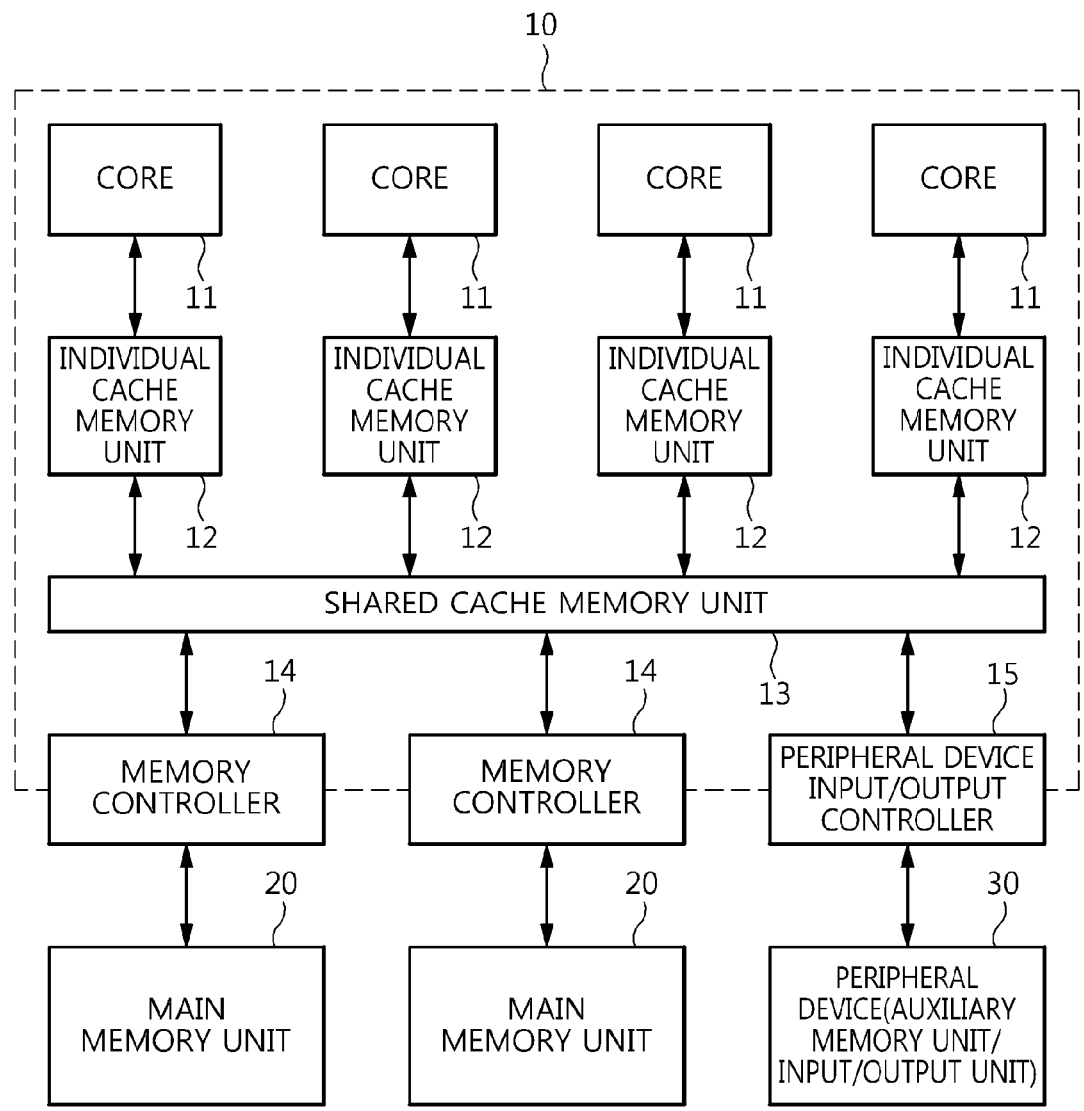
FIGS. 1 through 3 are block diagrams of an apparatus for interfacing between a central processing unit (CPU) and a main memory unit according to the related art.
Figure 2:
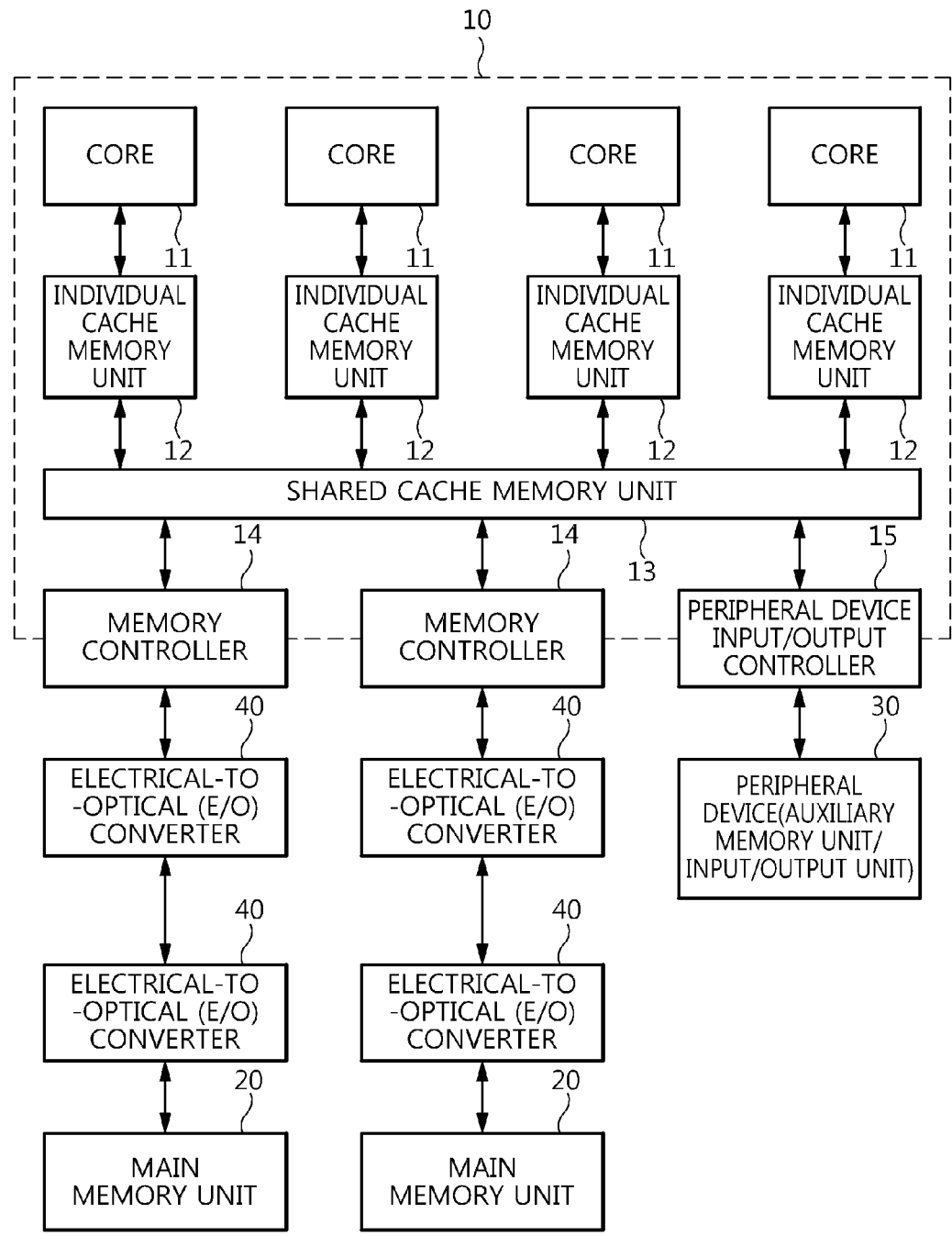
Figure 3:
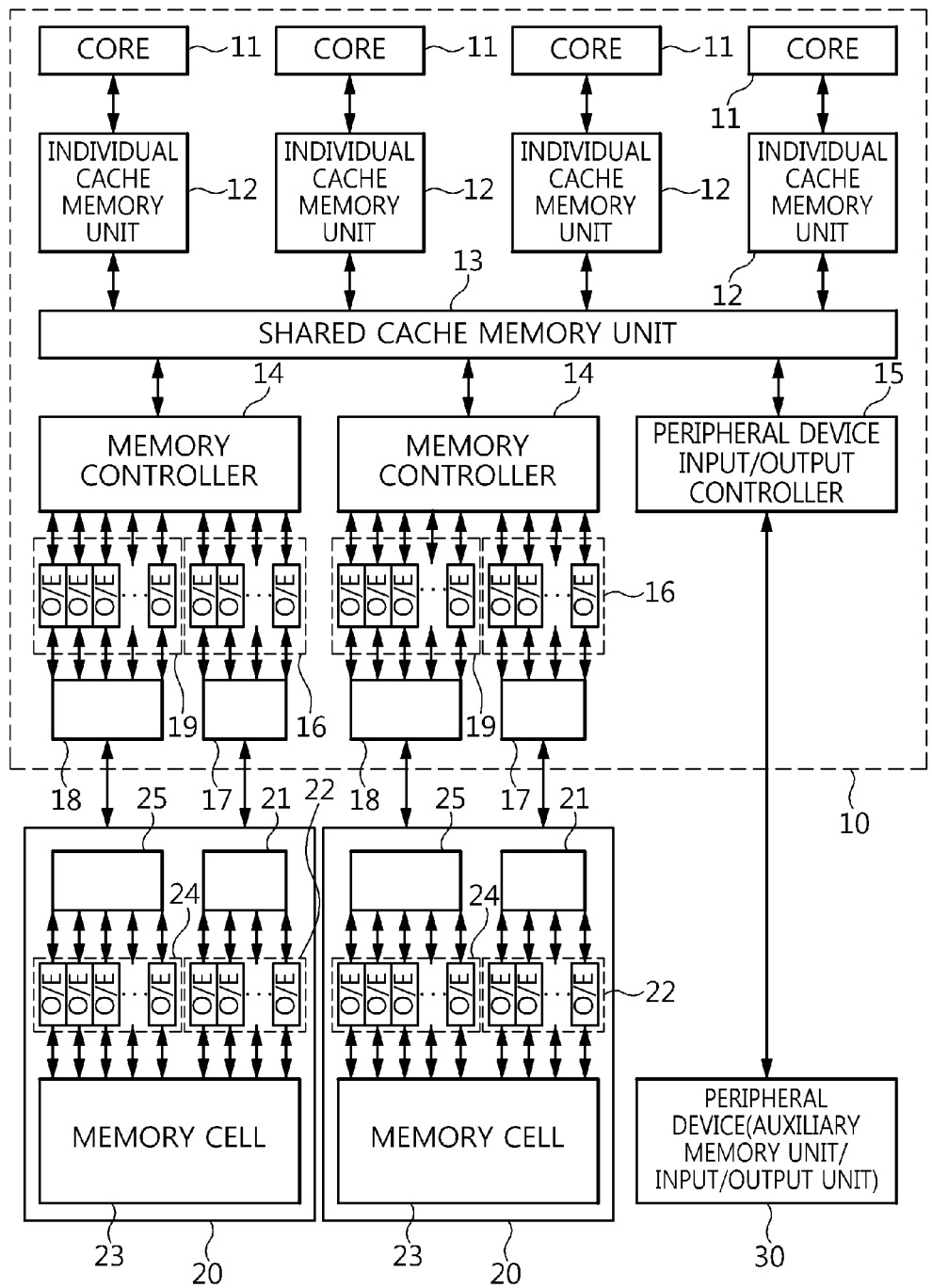

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Figure 4:
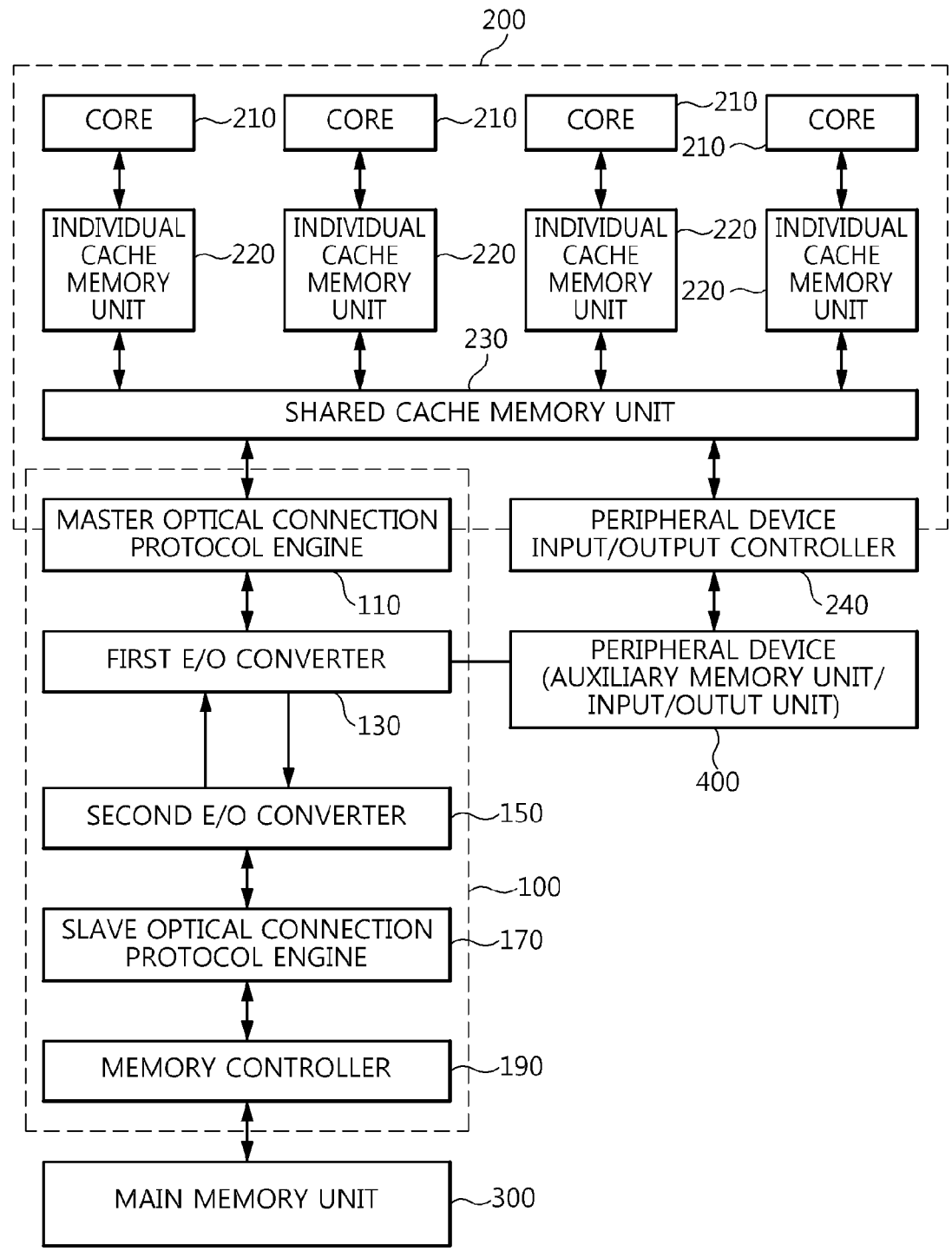
FIG. 4 is a block diagram of an apparatus for interfacing between a CPU and a main memory unit according to an embodiment of the present invention.
Figure 5:
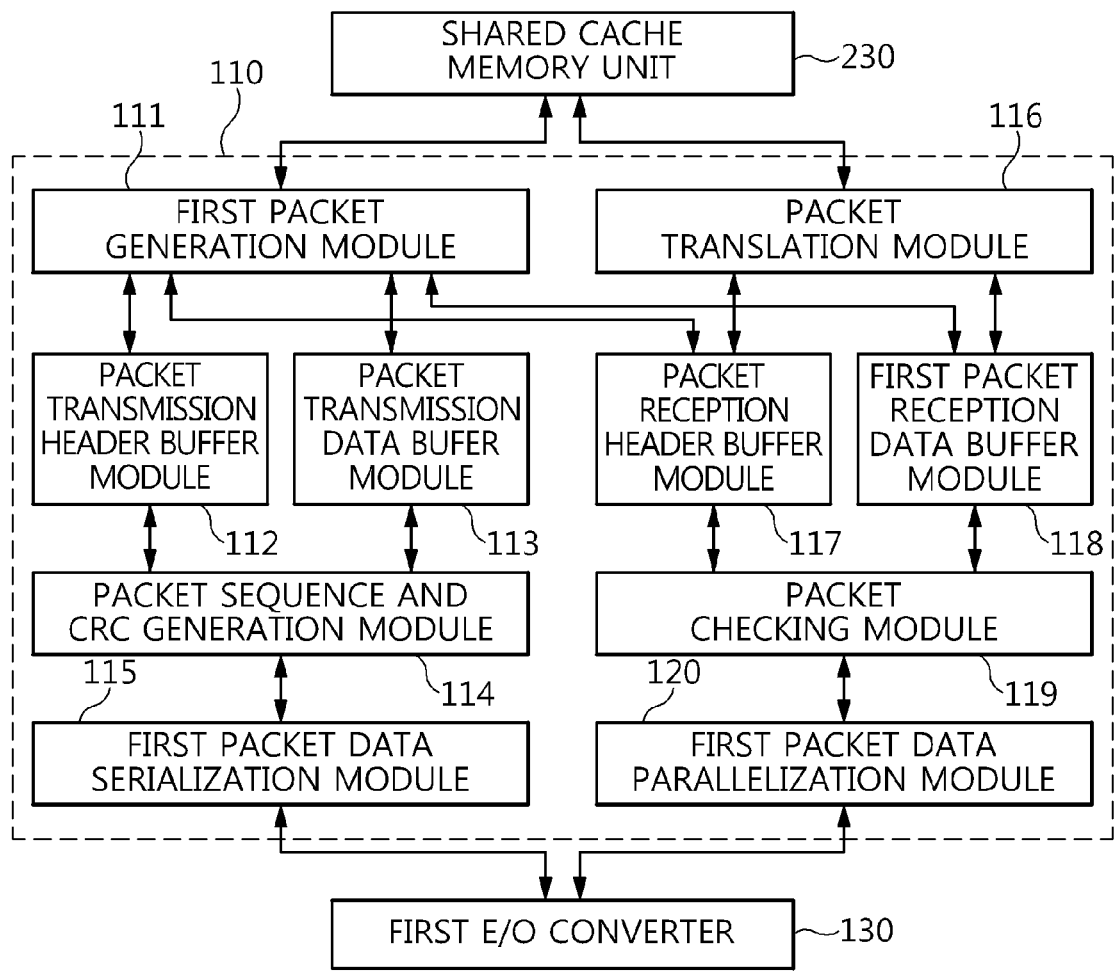
FIG. 5 is a block diagram of a master optical connection protocol engine illustrated in FIG. 4.
Figure 6:
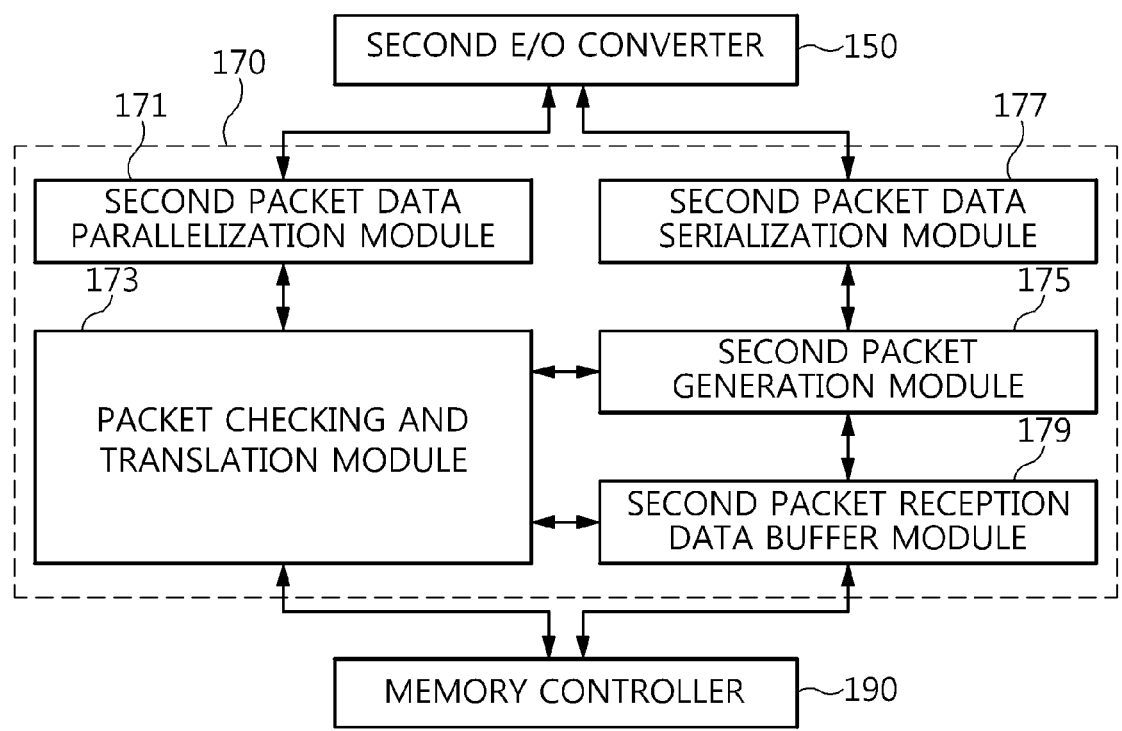
FIG. 6 is a block diagram of a slave optical connection protocol engine illustrated in FIG. 4.

Hereinafter, an apparatus for interfacing between a central processing unit (CPU) and a main memory unit according to an embodiment of the present invention will be described in detail with reference to the accompanying drawings. FIG. 4 is a block diagram of an apparatus for interfacing between a CPU and a main memory unit according to an embodiment of the present invention, and FIG. 5 is a block diagram of a master optical connection protocol engine illustrated in FIG. 4, and FIG. 6 is a block diagram of a slave optical connection protocol engine illustrated in FIG. 4.

As illustrated in FIG. 4, an apparatus 100 for interfacing between a central processing unit (CPU) 200 and a main memory unit 300 includes a master optical connection protocol engine 110, a first electrical-to-optical (E/O) converter 130, a second E/O converter 150, a slave optical connection protocol engine 170, and a memory controller 190. In this case, the master optical connection protocol engine 110 and the first E/O converter 130 are embedded in the CPU 200 or are configured as separate units. The second E/O converter 150, the slave optical connection protocol engine 170, and the memory controller 190 are configured as separate units or are embedded in the main memory unit 300.

The master optical connection protocol engine 110 is connected to a shared cache memory unit 230 of the CPU 200 and the first E/O converter 130. The master optical connection protocol engine 110 converts signals that are transmitted between the shared cache memory unit 230 and the memory controller 190 so that a writing operation or a reading operation of the main memory unit 300 can be performed.

The master optical connection protocol engine 110 converts packets that are transmitted from the shared cache memory unit 230 to the memory controller 190 so that the writing operation or the reading operation of the main memory unit 300 can be performed. That is, the master optical connection protocol engine 110 receives the packets for performing the writing operation or the reading operation of the main memory unit 300 from the shared cache memory unit 230. In this case, the master optical connection protocol engine 110 receives the packets for the writing operation or the reading operation of the main memory unit 300 as parallel signals. The master optical connection protocol engine 110 serializes the received parallel signals and converts the serialized parallel signals into serial signals. The master optical connection protocol engine 110 transmits the converted serial signals to the first E/O converter 130.

The master optical connection protocol engine 110 receives operation control signals (packets) for the writing operation or the reading operation of the main memory unit 300 from the shared cache memory unit 230. In this case, the master optical connection protocol engine 110 receives the operation control signals for the writing operation or the reading operation of the main memory unit 300 in the form of parallel signals. The master optical connection protocol engine 110 serializes the received operation control signals and converts the serialized operation control signals into serial signals. The master optical connection protocol engine 110 transmits the operation control signals that are converted into the serial signals, to the first E/O converter 130.

The master optical connection protocol engine 110 receives writing operation signals for the writing operation of the main memory unit 300 from the shared cache memory unit 230 of the CPU 200. In this case, the master optical connection protocol engine 110 receives the writing operation signals including a memory address, memory control information, and memory writing data in the form of electrical signals, i.e., parallel signals. Here, the memory address is a memory address having the entire length of a region of the memory address that the CPU 200 may access. The memory control information includes signals that indicate a writing operation, whether to perform a burst operation of data, i.e., signals for determining the length of data, and mask information that indicates a portion of data where the writing operation will be actually performed. The master optical connection protocol engine 110 converts the received writing operation signals into electrical signals and transmits the electrical signals to the first E/O converter 130. In this case, the master optical connection protocol engine 110 converts the electrical signals that are parallel signals into serial signals and transmits the serial signals to the first E/O converter 130.

The master optical connection protocol engine 110 receives reading operation signals from the shared cache memory unit 230. In this case, the reading operation signals include a memory address and memory control information. Here, the memory address is a memory address having the entire length of a region of the memory address that the CPU 200 may access. The memory control information includes signals that indicate a reading operation, whether to perform a burst operation of data for determining the length of the data, and mask information that indicates a portion of data where the reading operation will be actually performed. The master optical connection protocol engine 110 generates packets based on a buffer status of the master optical connection protocol engine 110, a buffer status of the slave optical connection protocol engine 170, and the reading operation signals. That is, the first packet generation module 111 of the master optical connection protocol engine 110 generates packets by connecting the packet header, the packet sequence and a cyclic redundancy code (CRC) that are generated based on the status of the packet transmission header buffer module 112, the status of the packet reception header buffer module 117, and the status of the first packet reception data buffer module 118 and the reading operation signals if the redundant space is present in the second packet reception data buffer module 179. The master optical connection protocol engine 110 converts the generated packets in the form of parallel signals into serial signals and transmits the serial signals to the first E/O converter 130.

The master optical connection protocol engine 110 converts the packets that are transmitted from the memory controller 190 to the shared cache memory unit 230 so that the writing operation or the reading operation of the main memory unit 300 can be performed. That is, the master optical connection protocol engine 110 receives the packets for the writing operation or the reading operation of the main memory unit 300 from the first E/O converter 130. In this case, the master optical connection protocol engine 110 receives the packets for the writing operation or the reading operation of the main memory unit 300 as serial signals. The master optical connection protocol engine 110 converts the received serial signals into parallel signals. The master optical connection protocol engine 110 transmits the converted parallel signals to the shared cache memory unit 230.

The master optical connection protocol engine 110 receives response signals with respect to operation control signals from the first E/O converter 130. In this case, the master optical connection protocol engine 110 receives writing operation response signals, reading operation response signals, and retransmission request signals of the reading operation response signals in the form of serial signals. The master optical connection protocol engine 110 performs self processing by converting the received operation control signals into the form of parallel signals or transmits the converted parallel signals to the shared cache memory unit 230.

The master optical connection protocol engine 110 receives the writing operation response signals from the first E/O converter 130. In this case, the master optical connection protocol engine 110 terminates the writing operation if the writing operation response signals are writing operation response signals that indicate the writing operation has been finished. If the master optical connection protocol engine 110 does not receive the writing operation response signals within a setting time or receives writing operation response signals that indicate a writing operation error, the master optical connection protocol engine 110 converts the writing operation signals that have been already transmitted into serial signals and retransmits the serial signals to the first E/O converter 130.

To this end, as illustrated in FIG. 5, the master optical connection protocol engine 110 includes the first packet generation module 111, the packet transmission header buffer module 112, a packet transmission data buffer module 113, a packet sequence and CRC generation module 114, a first packet data serialization module 115, a packet translation module 116, the packet reception header buffer module 117, the first packet reception data buffer module 118, a packet checking module 119, and a first packet data parallelization module 120.

The first packet generation module 111 generates a packet header and packet data based on the received writing operation signals. The first packet generation module 111 checks whether redundant spaces are present in the packet transmission header buffer module 112 and the packet transmission data buffer module 113.

The first packet generation module 111 generates the packet header and the packet data based on the writing operation signals if the redundant spaces are present in the packet transmission header buffer module 112 and the packet transmission data buffer module 113. In this case, the first packet generation module 111 generates the packet header including a memory address, a field that indicates writing operation signals, a length of data, mask information of the data, and an address of a packet data buffer module. Here, the address of the packet data buffer module is an address of a region in which packet data associated with the contents of the packet header is actually stored in the packet data buffer module.

The first packet generation module 111 stores the generated packet header and packet data. That is, the first packet generation module 111 stores the generated packet header in a packet header buffer module and stores the generated data in the packet data buffer module. In this case, the first packet generation module 111 stores the packet header and the packet data and adjusts subsequent operation control signals, so that, when the first packet generation module 111 transmits several pieces of data, the first packet generation module 111 causes subsequent data to be input or when the first packet generation module 111 transmits only one piece of data, the first packet generation module 111 causes subsequent access to be continuously performed.

If no redundant space is present in the packet transmission header buffer module 112 and the packet transmission data buffer module 113, the first packet generation module 111 adjusts the subsequent operation control signals and does not immediately execute the subsequent data or perform subsequent access in the shared cache memory unit 130 and waits for a current operation.

The first packet generation module 111 determines statuses of the packet transmission header buffer module 112, the packet reception header buffer module 117, and the first packet reception data buffer module 118 and whether a redundant space is present in the second packet reception data buffer module 179.

If redundant spaces are present in all buffer modules of the master optical connection protocol engine 110, the first packet generation module 111 generates a packet header based on reading operation signals. In this case, the first packet generation module 111 generates the packet header including a field that indicates an address of memory and reading and a length of data and mask information of the data.

The first packet generation module 111 stores the packet header that has been already generated, in the packet transmission header buffer module 112. In this case, the first packet generation module 111 performs an operation of storing the packet header in the packet transmission header buffer module 112 and adjusts subsequent operation control signals so that subsequent access can be continuously performed.

The first packet generation module 111 is maintained in a standby state if the redundant spaces are insufficient in at least one of the buffer modules. That is, the first packet generation module 111 adjusts the subsequent operation control signals, does not immediately perform subsequent access in the shared cache memory unit 230 and waits for a current operation if the redundant spaces are insufficient in at least one of the packet transmission header buffer module 112, the packet reception header buffer module 117, the first packet reception data buffer module 118, and the second packet reception data buffer module 179.

The packet transmission header buffer module 112 stores the packet header generated by the first packet generation module 111.

The packet transmission data buffer module 113 stores the packet data generated by the first packet generation module 111.

The packet sequence and CRC generation module 114 generates a packet sequence if storing of the packet header and the packet data generated by the first packet generation module 111 is finished. That is, the packet sequence and CRC generation module 114 recognizes that data are present in the packet transmission header buffer module 112 and the packet transmission data buffer module 113, if the first packet generation module 111 finishes an operation of storing the packet header and the packet data in the packet transmission header buffer module 112 and the packet transmission data buffer module 113. Accordingly, the packet sequence and CRC generation module 114 generates the packet sequence.

The packet sequence and CRC generation module 114 detects the packet header stored in the packet transmission header buffer module 112 and the packet reception header buffer module 117. That is, the packet sequence and CRC generation module 114 detects the packet header including a memory address, a field that indicates writing operation signals, a length of data, mask information of the data, and an address of a packet data buffer module from the packet transmission header buffer module 112 and the packet reception header buffer module 117.

The packet sequence and CRC generation module 114 detects the packet data based on the detected packet header. That is, the packet sequence and CRC generation module 114 detects the address of the packet data buffer module included in the packet header that has been already detected. The packet sequence and CRC generation module 114 detects the packet data stored in a region corresponding to the detected address of the packet data buffer module.

The packet sequence and CRC generation module 114 generates a packet CRC based on the packet header and the packet data that have been already detected. The packet sequence and CRC generation module 114 generates packets by connecting the detected packet header and packet data and the packet CRC. The packet sequence and CRC generation module 114 transmits the generated packets to the first packet data serialization module 115. The packet sequence and CRC generation module 114 transmits information regarding transmission of the packets to the packet checking module 119 and then is maintained in a standby state.

The packet sequence and CRC generation module 114 determines whether the reading response signals are normally received, based on the packet reception information received from the packet checking module 119. In this case, the packet sequence and CRC generation module 114 determines whether the reading response signals are normally received, based on the packet sequence and CRC included in the packet reception information.

If the packet sequence and CRC generation module 114 normally receives the reading response signals, the packet sequence and CRC generation module 114 generates normally-received signals with respect to the reading response signals and transmits the generated normally-received signals to the first packet data serialization module 115. That is, determination of the packet sequence and CRC generation module 114 to normally receive the reading response signals means that the reading operation signals that have been already transmitted are normally transmitted to the main memory unit 300. Thus, the packet sequence and CRC generation module 114 reads subsequent memory access information from the packet transmission header buffer module 112 and the packet transmission data buffer module 113 and is maintained in a state in which the packet sequence and CRC generation module 114 may transmit next packets. The packet sequence and CRC generation module 114 generates normally-received signals including the reception of memory reading response packets so as to inform the slave optical connection protocol engine 170 of information regarding that the memory reading response packets have been already received before reading next memory access information. The packet sequence and CRC generation module 114 transmits the normally-received signals that have been already generated, as parallel signals to the first packet data serialization module 115.

If the packet sequence and CRC generation module 114 determines that the reading response signals are abnormally received, the packet sequence and CRC generation module 114 generates reception error signals of the reading response signals and transmits the generated reception error signals to the first packet data serialization module 115. That is, the packet sequence and CRC generation module 114 generates reception error signals indicating that an error (a problem) occurs in the received reading response signals so as to request retransmission of the reading response signals from the slave optical connection protocol engine 170. The packet sequence and CRC generation module 114 converts the generated reception error signals into the form of parallel signals and transmits the parallel signals to the first packet data serialization module 115.

The first packet data serialization module 115 serializes packets based on the packet sequence generated by the packet sequence and CRC generation module 114 and generates serial signals. The first packet data serialization module 115 transmits the serial signals that have been already generated, to the first E/O converter 130. In this case, the first packet data serialization module 115 serializes the packets by a bandwidth that may be processed by the first E/O converter 130. Here, when the bandwidth that may be processed by the first E/O converter 130 is smaller than a bandwidth that may be processed by the master optical connection protocol engine 110, a plurality of first packet data serialization modules 115 may be configured and may serialize the packets to be suitable for the bandwidth that may be processed by the master optical connection protocol engine 110.

The first packet data serialization module 115 converts the parallel signals into serial signals and transmits the serial signals to the first E/O converter 130. That is, the first packet data serialization module 115 serializes the normally-received signals and the reception error signals with respect to the reading response signals received from the packet sequence and CRC generation module 114 and converts the normally-received signals and the reception error signals into serial signals. The first packet data serialization module 115 transmits the converted serial signals to the first E/O converter 130.

The packet translation module 116 detects a position where data is stored, based on the stored packet header if storing of the packet header and data is finished. That is, the packet translation module 116 detects the packet header stored in the packet reception header buffer module 117. The packet translation module 116 detects the position where data is stored, from the detected packet header.

The packet translation module 116 detects data from the first packet reception data buffer module 118 based on the detected storage position. That is, the packet translation module 116 detects data stored in the detected storage position among data stored in the first packet reception data buffer module 118, i.e., data detected from the main memory unit 300 according to the reading operation signals.

The packet translation module 116 transmits the detected data to the shared cache memory unit 230 together with the reading operation signals.

The first packet data parallelization module 120 converts the serial signals received from the first E/O converter 130 into parallel signals. That is, the first packet data parallelization module 120 converts packets in the form of serial signals received from the first E/O converter 130, i.e., reading response signals and writing response signals. The first packet data parallelization module 120 transmits the converted parallel signals to the packet checking module 119.

The packet checking module 119 monitors and manages statuses of the packet transmission header buffer module 112, the packet reception header buffer module 117, and the first packet reception data buffer module 118. That is, the packet checking module 119 monitors and manages status information including redundant spaces of the packet transmission header buffer module 112, the packet reception header buffer module 117, and the first packet reception data buffer module 118.

The packet checking module 119 detects a packet header and data from the parallel signals received from the first packet data parallelization module 120. The packet checking module 119 stores the detected packet header in the packet reception header buffer module 117. The packet checking module 119 stores the detected data in the first packet reception data buffer module 118.

The packet checking module 119 checks whether the parallel signals are redundantly received from the first packet data parallelization module 120. That is, the packet checking module 119 checks whether the parallel signals are redundantly received from the first packet data parallelization module 120, by detecting a packet sequence and a CRC from the received parallel signals. In this case, the packet checking module 119 generates packet reception information if it is checked that the parallel signals are not redundantly received from the first packet data parallelization module 120, and the packet checking module 119 transmits the generated packet reception information to the packet sequence and CRC generation module 114. Here, the packet checking module 119 generates packet reception information including the packet sequence and the CRC. On the other hand, if it is checked that parallel signals are redundantly received from the first packet data parallelization module 120, the packet checking module 119 terminates an operation of the parallel signals.

The packet reception header buffer module 117 stores the packet header received from the packet checking module 119. Here, the packet header includes a length of a packet and a position where data corresponding to the packet header is stored in the first packet reception data buffer module 118.

The first packet reception data buffer module 118 stores the data received from the packet checking module 119.

The first E/O converter 130 converts electrical signals received from the master optical connection protocol engine 110 into optical signals and transmits the optical signals to the second E/O converter 150. That is, the first E/O converter 130 converts operation control signals in the form of electrical signals received from the master optical connection protocol engine 110 into optical signals and transmits the optical signals to the second E/O converter 150. In this case, the first E/O converter 130 receives the operation control signals in the form of serial signals from the master optical connection protocol engine 110. The first E/O converter 130 converts the received serial signals into optical signals. The first E/O converter 130 transmits the converted optical signals to the second E/O converter 150.

The first E/O converter 130 converts optical signals received from the second E/O converter 150 into electrical signals and transmits the electrical signals to the master optical connection protocol engine 110. That is, the first E/O converter 130 receives the optical signals from the second E/O converter 150. The first E/O converter 130 transmits the converted serial signals to the master optical connection protocol engine 110.

The second E/O converter 150 converts the optical signals received from the first E/O converter 130 into electrical signals and transmits the electrical signals to the slave optical connection protocol engine 170. That is, the second E/O converter 150 receives the optical signals from the first E/O converter 130. The second E/O converter 150 converts the received optical signals into serial signals. The second E/O converter 150 transmits the converted serial signals to the slave optical connection protocol engine 170.

The second E/O converter 150 converts the electrical signals received from the slave optical connection protocol engine 170 into optical signals and transmits the optical signals to the first E/O converter 130. That is, the second E/O converter 150 receives serial signals from the slave optical connection protocol engine 170. The second E/O converter 150 converts the received serial signals into optical signals. The second E/O converter 150 transmits the converted optical signals to the first E/O converter 130.

The slave optical connection protocol engine 170 is connected to the second E/O converter 150 and the memory controller 190. The slave optical connection protocol engine 170 converts signals that are transmitted between the shared cache memory unit 230 and the memory controller 190 so that the writing operation or the reading operation of the main memory unit 300 can be performed.

The slave optical connection protocol engine 170 converts packets that are transmitted from the shared cache memory unit 230 to the memory controller 190 so that the writing operation or the reading operation of the main memory unit 300 can be performed. That is, the slave optical connection protocol engine 170 receives serial signals corresponding to the packets for the writing operation or the reading operation of the main memory unit 300 from the second E/O converter 150. The slave optical connection protocol engine 170 converts the received serial signals into parallel signals. The master optical connection protocol engine 110 transmits the converted parallel signals to the memory controller 190.

The slave optical connection protocol engine 170 converts operation control signals in the form of electrical signals received from the second E/O converter 150 into parallel signals and transmits the parallel signals to the memory controller 190. In this case, the slave optical connection protocol engine 170 receives the operation control signals, such as writing operation signals and reading operation signals, in the form of serial signals from the second E/O converter 150. The slave optical connection protocol engine 170 converts the serial signals into parallel signals and transmits the parallel signals to the memory controller 190.

The slave optical connection protocol engine 170 converts the packets that are transmitted from the memory controller 190 to the shared cache memory unit 230 so that the writing operation or the reading operation of the main memory unit 300 can be performed. That is, the slave optical connection protocol engine 170 receives the packets for the writing operation or the reading operation of the main memory unit 300 from the memory controller 190. In this case, the slave optical connection protocol engine 170 receives the packets for the writing operation or the reading operation of the main memory unit 300 in the form of parallel signals. The slave optical connection protocol engine 170 serializes the received parallel signals and converts the serialized parallel signals into serial signals. The master optical connection protocol engine 110 transmits the converted serial signals to the second E/O converter 150.

The slave optical connection protocol engine 170 performs operation control according to the serial signals received from the second E/O converter 150. That is, the slave optical connection protocol engine 170 performs self processing on the operation control signals in the form of the received serial signals or transmission of the operation control signals to the memory controller 190. In this case, the slave optical connection protocol engine 170 terminates a reading operation in serial signals which are redundantly received or in which an error occurs, or requests retransmission of reading response signals from the master optical connection protocol engine 110. The slave optical connection protocol engine 170 converts serial signals that are normally received into operation control signals in the form of parallel signals and transmits the operation control signals to the memory controller 190.

The slave optical connection protocol engine 170 converts data received from the memory controller 190 into serial signals and transmits the serial signals to the second E/O converter 150. That is, the slave optical connection protocol engine 170 receives response signals including a result of performing on the writing operation signals and the reading operation signals, i.e., reading response signals and writing response signals, in the form of parallel signals from the memory controller 190. The slave optical connection protocol engine 170 converts the response signals in the form of parallel signals into serial signals and transmits the serial signals to the second E/O converter 150.

To this end, as illustrated in FIG. 6, the slave optical connection protocol engine 170 includes a second packet data parallelization module 171, a packet checking and translation module 173, a second packet generation module 175, a second packet data serialization module 177, and the second packet reception data buffer module 179.

The second packet data parallelization module 171 converts the operation control signals and the response signals in the form of serial signals received from the second E/O converter 150 into parallel signals. That is, the second packet data parallelization module 171 converts the operation control signals, such as writing operation signals and reading operation signals in the form of serial signals and the response signals, such as normally-received signals and reception error signals, into parallel signals. The second packet data parallelization module 171 transmits the converted parallel signals to the packet checking and translation module 173.

The packet checking and translation module 173 checks whether the operation control signals are normally received, based on the parallel signals received from the second packet data parallelization module 171. That is, the packet checking and translation module 173 determines whether the parallel signals are normally received, based on the packet sequence and CRC of the parallel signals received from the second packet data parallelization module 171. In this case, the packet checking and translation module 173 determines whether the parallel signals are damaged, based on the packet sequence and CRC of the parallel signals.

The packet checking and translation module 173 generates writing operation signals based on the parallel signals if the received parallel signals are writing operation signals that are normally received. That is, the packet checking and translation module 173 generates writing operation signals including a memory address, memory control information, and memory writing data using the writing operation signals in the form of parallel signals that are normally received.

The packet checking and translation module 173 terminates processing of the parallel signals if the packet checking and translation module 173 does not normally receive the packets. That is, the packet checking and translation module 173 discards the packets and performs processing on subsequent parallel signals if the parallel signals are damaged or redundantly received. In this case, the packet checking and translation module 173 may also transmit retransmission request signals with respect to the writing operation signals in the form of parallel signals that are not normally received, to the master optical connection protocol engine 110.

The packet checking and translation module 173 transmits the generated writing operation signals to the memory controller 190. In this case, the packet checking and translation module 173 transmits several pieces of data to the memory controller 190 based on subsequent operation control signals if there are several pieces of data.

The packet checking and translation module 173 checks whether the operation control signals that are normally received, are redundantly received. In this case, the packet checking and translation module 173 determines whether the parallel signals are redundantly received, based on the packet sequence and CRC of the parallel signals.

The packet checking and translation module 173 transmits packets of the received reading operation signals to the memory controller 190 if the packets are not redundantly received. In this case, the packet checking and translation module 173 transmits the packets including the memory address and the memory control information to the memory controller 190. Also, the packet checking and translation module 173 transmits packet reception information to the second packet generation module 175. Here, the packet checking and translation module 173 does not transmit the packets to the memory controller 190 but terminates an operation of the reading operation signals if the packets are packets that are redundantly received.

The packet checking and translation module 173 transmits writing operation response signals received from the memory controller 190 to the second packet generation module 175. That is, the packet checking and translation module 173 checks the packet sequence and CRC of the parallel signals and generates packet reception information. If an error occurs in the packet sequence or CRC, the packet checking and translation module 173 generates the packet reception information that indicates a reception error, and if no error occurs in the packet sequence or CRC, the packet checking and translation module 173 generates the packet reception information that indicates normal reception. The packing checking and translation module 173 transmits the generated packet reception information and the parallel signals, i.e., response signals, to the second packet generation module 175.

The second packet generation module 175 generates writing operation response packets corresponding to the received writing operation response signals. The second packet generation module 175 transmits the generated writing operation response packets to the second packet data serialization module 177. In this case, the second packet generation module 175 transmits writing operation completion packets in the form of parallel signals to the second packet data serialization module 177.

The second packet generation module 175 monitors a status of the second packet reception data buffer module 179. In this case, the second packet generation module 175 transmits status information including a redundant space of the second packet reception data buffer module 179 cyclically to the second packet data serialization module 177.

The second packet generation module 175 generates a packet sequence and a packet header. That is, the second packet generation module 175 transmits storing completion signals to the packet checking and translation module 173 if storing of data in the second packet reception data buffer module 179 is completed. The second packet generation module 175 generates the packet sequence and the packet header based on the reception of information of the packets.

The second packet generation module 175 detects data stored in the second packet reception data buffer module 179.

That is, the second packet generation module 175 detects data stored in the second packet reception data buffer module 179 according to the reading operation signals.

The second packet generation module 175 generates a CRC based on the packet sequence, the packet header, and the detected data. The second packet generation module 175 generates reading response packets by connecting the packet sequence, the packet header, the data, and the CRC. The second packet generation module 175 converts the generated reading response packets into parallel signals and transmits the parallel signals to the second packet data serialization module 177.

The second packet generation module 175 determines whether the parallel signals, i.e., the response signals are normally received, based on the packet reception information. In this case, if the second packet generation module 175 receives the packet reception information that indicates a reception error, the second packet generation module 175 determines that an error occurs in receiving the parallel signals.

If the second packet generation module 175 determines that an error occurs in receiving the parallel signals, the second packet generation module 175 requests retransmission of the reading response signals from the master optical connection protocol engine 110. That is, the second packet generation module 175 generates signals (or packets) that request retransmission of the response signals and transmits the generated signals in the form of parallel signals to the second packet data serialization module 177. The second packet data serialization module 177 converts the parallel signals into serial signals and transmits the serial signals to the second E/O converter 150. The second E/O converter 150 transmits optical signals to the first E/O converter 130, and the first E/O converter 130 converts the optical signals into serial signals and transmits the serial signals to the master optical connection protocol engine 110.

The second packet generation module 175 performs preparation of next operation control signals if the parallel signals are signals that are normally received. That is, since it has ascertained that memory reading response packets that are in progress have been received by the master optical connection protocol engine 110, the second packet generation module 175 prepares to generate writing response packets or reading response packets with the packet reception information transmitted from the packet checking and translation module 175 and the contents of the packet reception data buffer module.

If the received packet reception information is error response signal packets, the second packet generation module 175 retransmits the reading response signals to the second packet data serialization module 177. That is, if the second packet generation module 175 receives the error response signal packets, the second packet generation module 175 retransmits the reading response signals that have been already transmitted. The second packet generation module 175 waits until it receives packets indicating that the memory reading response packets have been properly transmitted, i.e., response packets to the reading response signals. In this case, if the second packet generation module 175 does not receive the response packets to the reading response signals within a setting time, the second packet generation module 175 determines that the reading response signals are not normally transmitted to the master optical connection protocol engine 110. Accordingly, the second packet generation module 175 retransmits the reading response signals by repeatedly performing the above-described process. Here, if the second packet generation module 175 does not the response packets to the reading response signals within the setting time, a problem may occur in a transmission line in which the reading response packets are transmitted or in a transmission line in which the response packets indicating that the reading response packets have been received, are received.

The second packet date serialization module 177 serializes the parallel signals and transmits the serialized signals to the second E/O converter 150. In this case, the second packet data serialization module 177 transmits serial signals obtained by serializing the parallel signals to the second E/O converter 150. If a bandwidth of the memory controller 190 is larger than that of the second E/O converter 150, several second E/O converters 150 may be used. The second packet data serialization module 177 serializes status information received from the second packet generation module 175, generates serial signals and transmits the generated serial signals to the second E/O converter 150.

The second packet reception data buffer module 179 stores the data received from the memory controller 190.

The memory controller 190 has access to the main memory unit 300 based on the parallel signals received from the slave optical connection protocol engine 170. If the received parallel signals are writing operation signals, the memory controller 190 finishes a writing operation into the main memory unit 300 and then terminates the writing operation. The memory controller 190 detects data from the main memory unit 300 if the received parallel signals are reading operation signals. The memory controller 190 transmits the detected data, i.e., reading data to the slave optical connection protocol engine 170 using electrical signals.

The memory controller 190 transmits the response packets including a result of performing an operation, for example, normal or error, on the parallel signals, i.e., the operation control signals, to the slave optical connection protocol engine 170.

The memory controller 190 transmits the writing operation response signals with respect to the writing operation signals to the slave optical connection protocol engine 170. In this case, the memory controller 190 transmits writing operation completion signals or writing operation error signals as writing operation response signals.

The memory controller 190 detects data according to the reading operation signals and transmits the detected data to the salve optical connection protocol engine 170. That is, the memory controller 190 detects data based on a memory address and memory control information included in the received parallel signals. The memory controller 190 transmits reading data control signals together with the detected data to the slave optical connection protocol engine 170.

Figure 7:
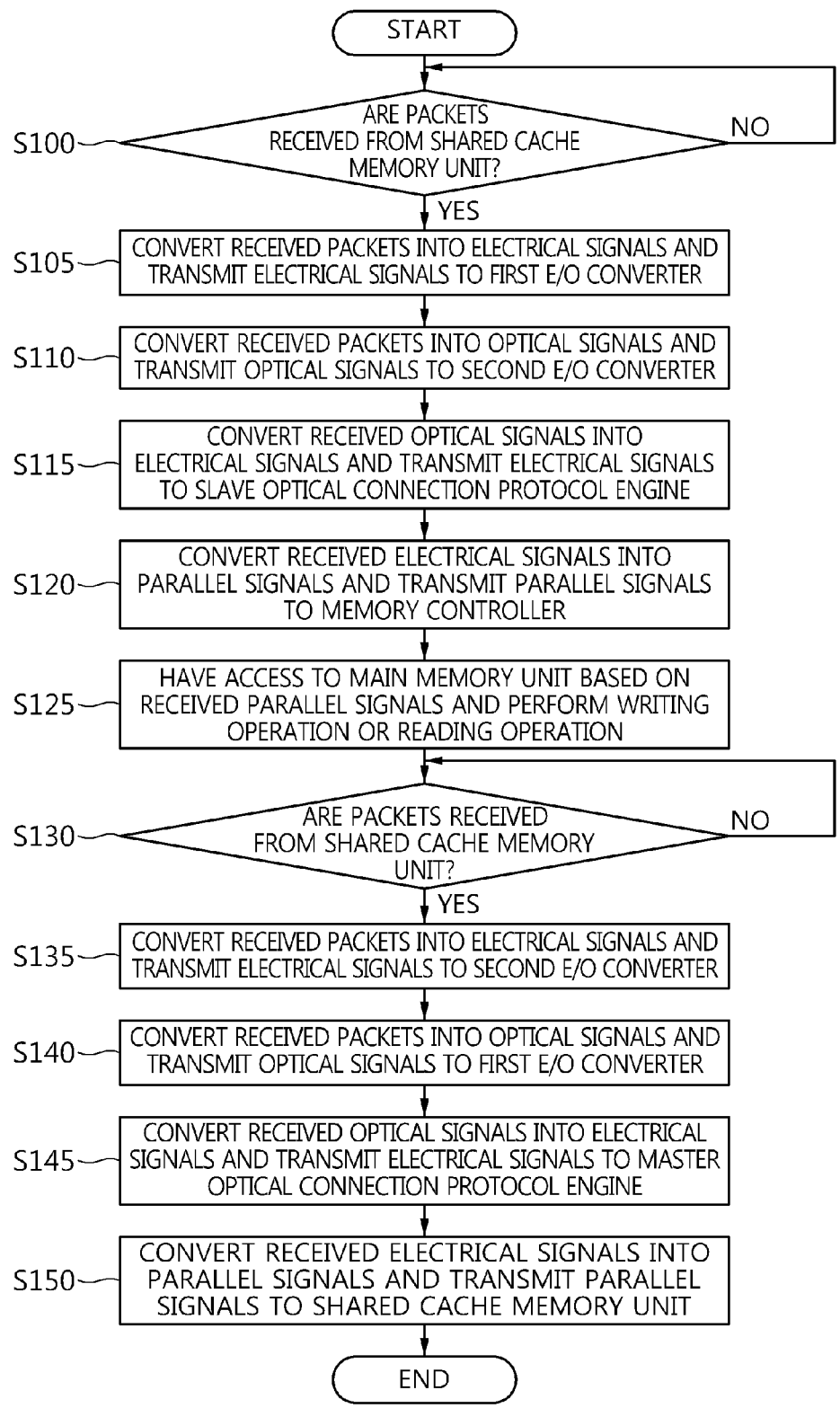
FIG. 7 is a flowchart illustrating a method for interfacing between a CPU and a main memory unit according to an embodiment of the present invention.

Hereinafter, a method for interfacing between a CPU and a main memory unit according to an embodiment of the present invention will be described in detail with reference to the accompanying drawings. FIG. 7 is a flowchart illustrating the method for interfacing between the CPU and the main memory unit according to an embodiment of the present invention.

If packets are received from the shared cache memory unit 230 (S100; YES), the master optical connection protocol engine 110 converts the packets that are transmitted from the shared cache memory unit 230 to the memory controller 190 into electrical signals and transmits the electrical signals to the first E/O converter 130 so that a writing operation or a reading operation of the main memory unit 300 can be performed (S105). That is, the master optical connection protocol engine 110 receives packets for the writing operation or reading operation of the main memory unit 300 as parallel signals. The master optical connection protocol engine 110 serializes the received parallel signals and converts the serialized parallel signals into serial signals. The master optical connection protocol engine 110 transmits the converted serial signals to the first E/O converter 130.

The first E/O converter 130 converts the electrical signals received from the master optical connection protocol engine 110 into optical signals and transmits the optical signals to the second E/O converter 150 (S110). That is, the first E/O converter 130 converts the serial signals received from the master optical connection protocol engine 110 into optical signals. The first E/O converter 130 transmits the converted optical signals to the second E/O converter 150.

The second E/O converter 150 converts the optical signals received from the first E/O converter 130 into electrical signals and transmits the electrical signals to the slave optical connection protocol engine 170 (S115). That is, the second E/O converter 150 converts the optical signals received from the first E/O converter 130 into serial signals. The second E/O converter 150 transmits the converted serial signals to the slave optical connection protocol engine 170.

The slave optical connection protocol engine 170 converts the electrical signals received from the second E/O converter 150 into parallel signals and transmits the parallel signals to the memory controller 190 (S120). That is, the salve optical connection protocol engine 170 converts the serial signals received from the second E/O converter 150 into parallel signals and transmits the parallel signals to the memory controller 190.

The memory controller 190 has access to the main memory unit 300 based on the parallel signals received from the slave optical connection protocol engine 170 and performs a writing operation or reading operation (S125). That is, if the received parallel signals are writing operation signals, the memory controller 190 finishes a writing operation into the main memory unit 300 and then terminates the writing operation. The memory controller 190 transmits response packets including a result of performing the writing operation, for example, normal or error, to the slave optical connection protocol engine 170. If the received parallel signals are reading operation signals, the memory controller 190 detects data from the main memory unit 300. The memory controller 190 constitutes the detected data, i.e., reading data of response packets and transmits the data to the slave optical connection protocol engine 170.

If the packets are received from the memory controller 190 (S130; YES), the slave optical connection protocol engine 170 converts the received packets into electrical signals and transmits the electrical signals to the second E/O converter 150 (S135). That is, the slave optical connection protocol engine 170 receives response packets in the form of parallel signals from the memory controller 190. The slave optical connection protocol engine 170 serializes the received parallel signals and converts the serialized signals into serial signals. The master optical connection protocol engine 110 transmits the converted serial signals to the second E/O converter 150.

The second E/O converter 150 converts the serial signals received from the slave optical connection protocol engine 170 into optical signals and transmits the optical signals to the first E/O converter 130 (S140). That is, the second E/O converter 150 receives the response packets in the form of serial signals from the slave optical connection protocol engine 170. The second E/O converter 150 converts the received serial signals into optical signals and transmits the optical signals to the first E/O converter 130.

The first E/O converter 130 converts the optical signals received from the second E/O converter 150 into electrical signals and transmits the electrical signals to the master optical connection protocol engine 110 (S145). That is, the first E/O converter 130 converts the optical signals received from the second E/O converter 150 into serial signals. The first E/O converter 130 transmits the converted serial signals to the master optical connection protocol engine 110.

The master optical connection protocol engine 110 converts the electrical signals received from the first E/O converter 130 into parallel signals and transmits the parallel signals to the shared cache memory unit 230 (S150). That is, the master optical connection protocol engine 110 converts the received serial signals into parallel signals and transmits the parallel signals to the shared cache memory unit 230.

Figure 8:
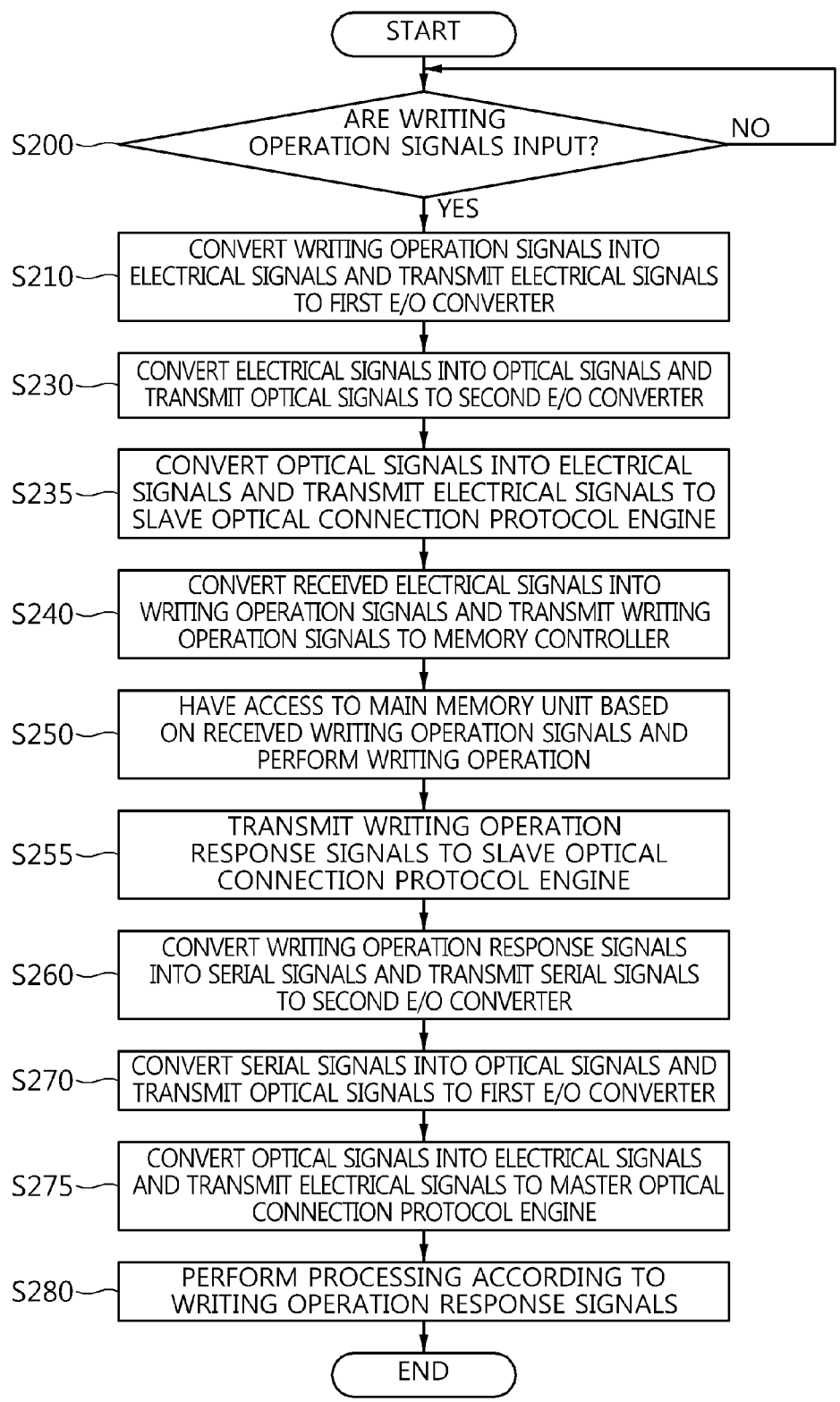
FIG. 8 is a flowchart illustrating a writing operation of the main memory unit of the method for interfacing between the CPU and the main memory unit illustrated in FIG. 7.
Figure 9:
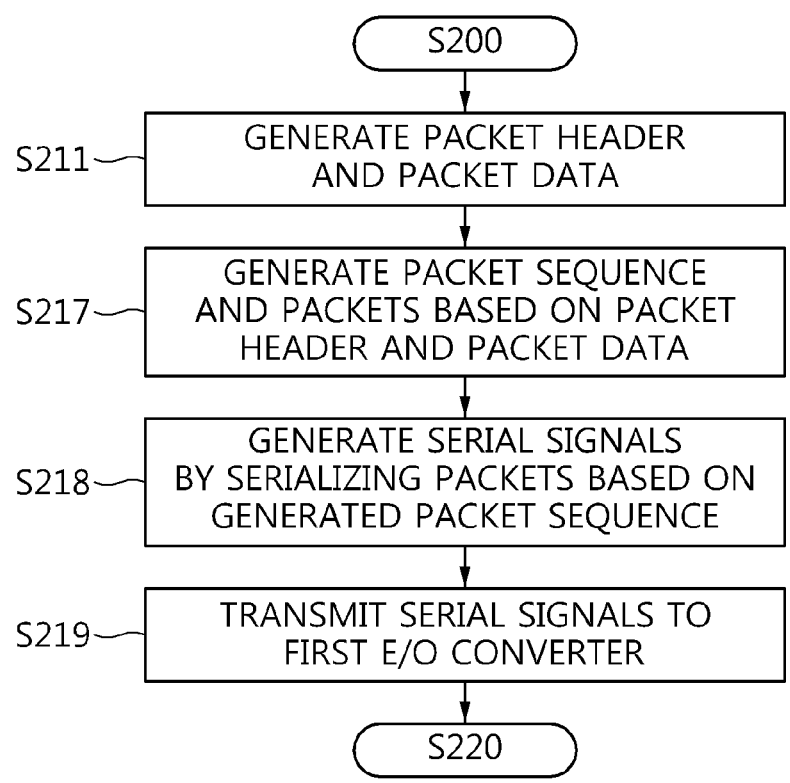
FIGS. 9 through 11 are flowcharts illustrating an operation of converting writing operation signals of FIG. 8 into electrical signals and transmitting the electrical signals to a first electrical-to-optical (E/O) converter.
Figure 10:
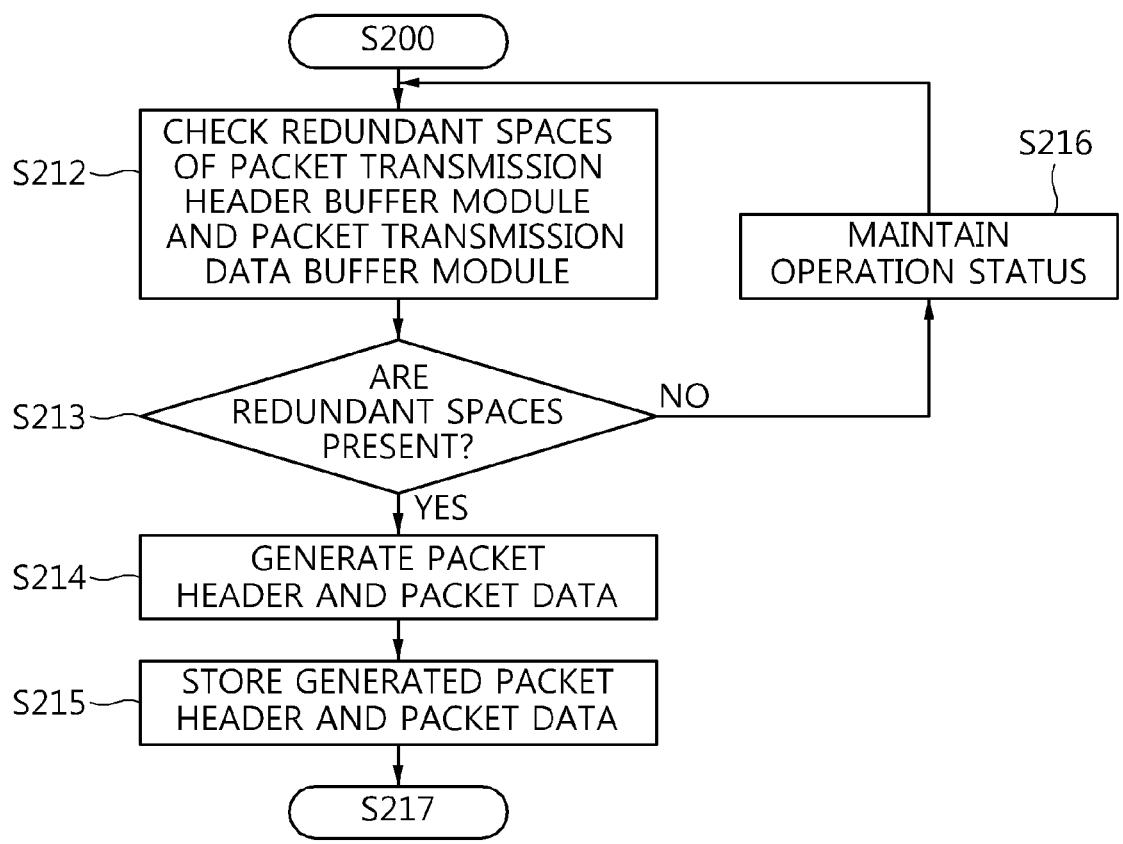
Figure 11:
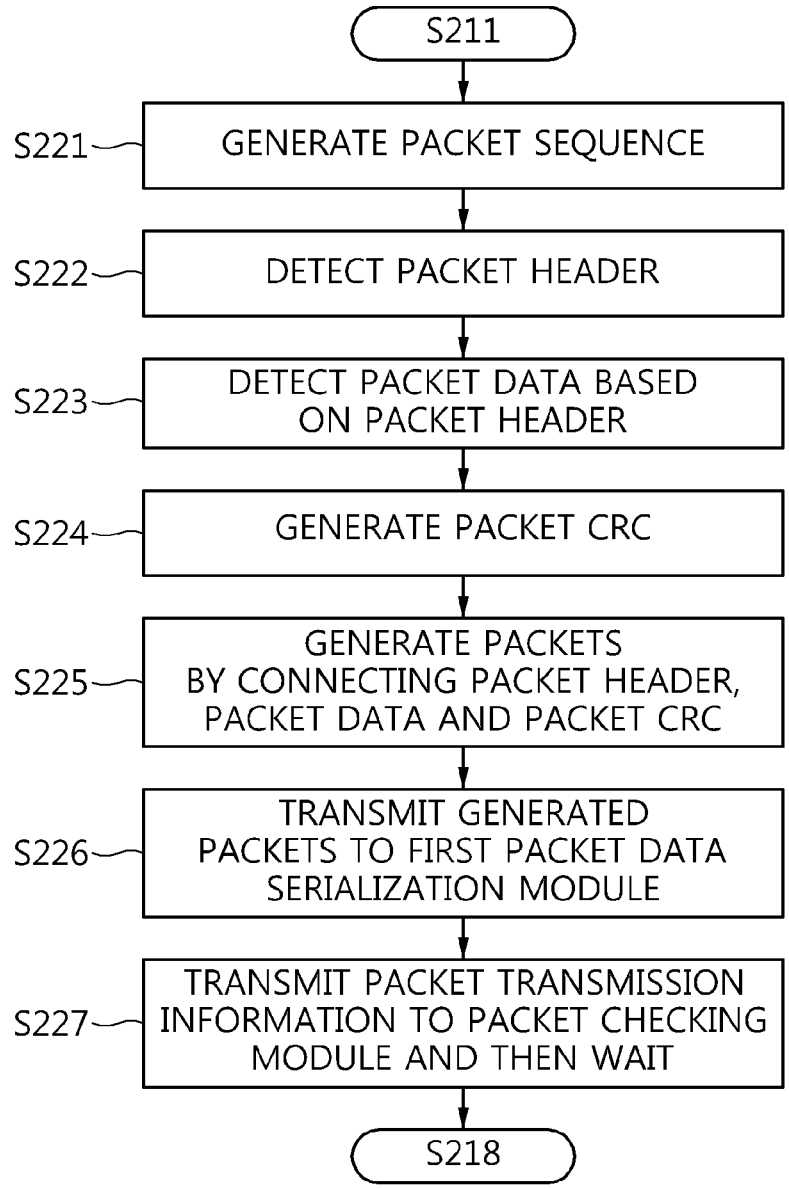
Figure 12:
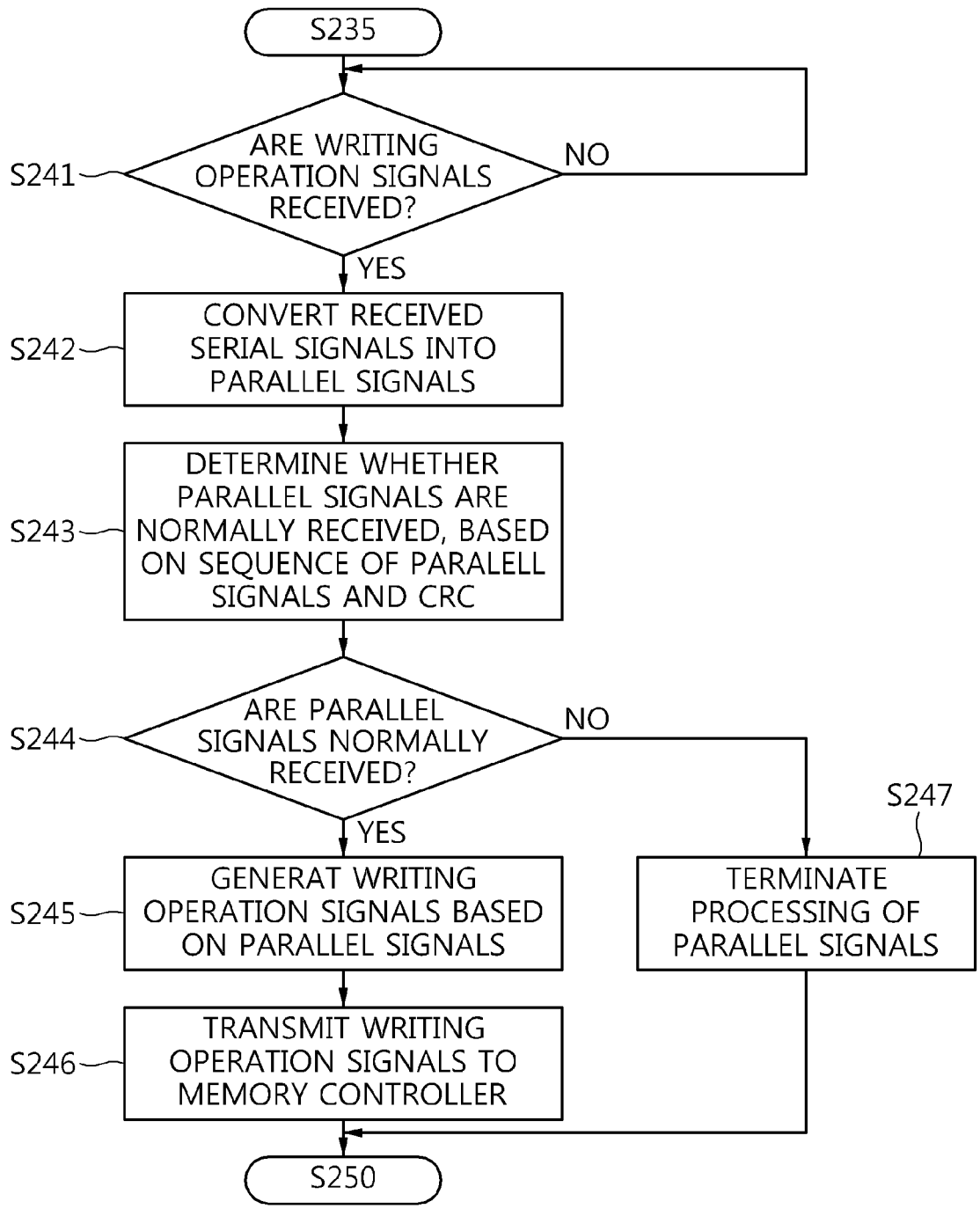
FIG. 12 is a flowchart illustrating an operation of converting the electrical signals of FIG. 8 into writing operation signals and transmitting the writing operation signals to a memory controller.
Figure 13:
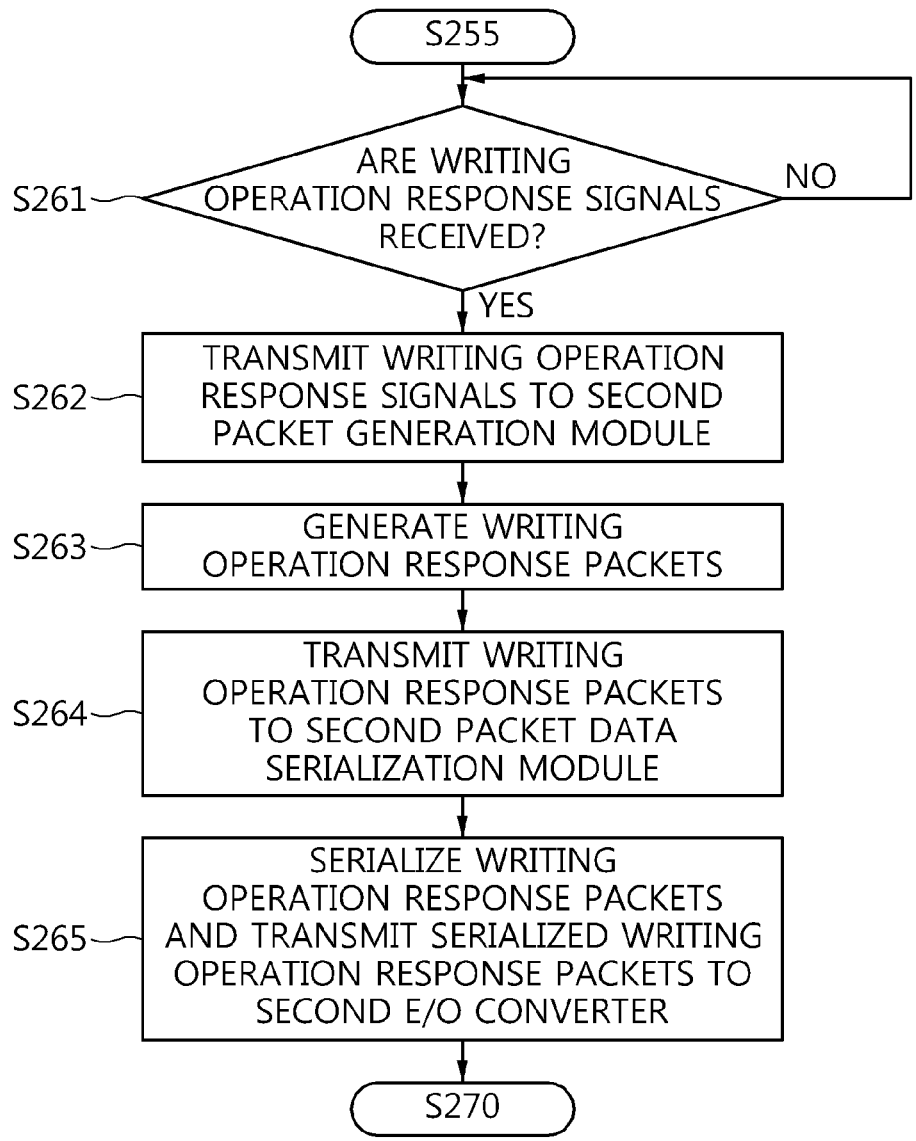
FIG. 13 is a flowchart illustrating an operation of converting writing operation response signals of FIG. 8 into serial signals and transmitting the serial signals to a second E/O converter.
Figure 14:
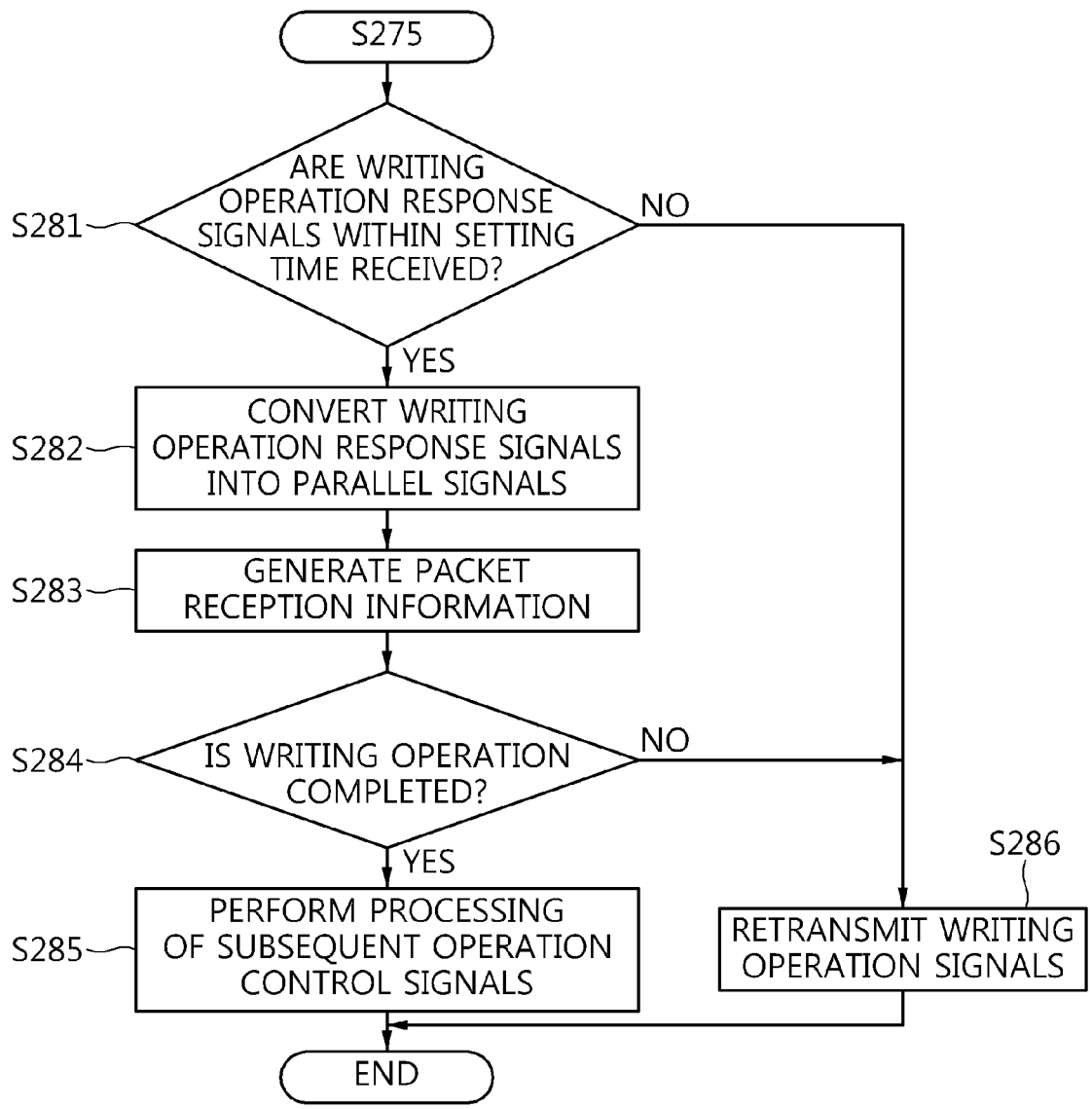
FIG. 14 is a flowchart illustrating an operation of processing the writing operation response signals of FIG. 8.

Hereinafter, a writing operation of a main memory unit of the method for interfacing the CPU and the main memory unit illustrated in FIG. 7 will be described in detail with reference to the accompanying drawings. FIG. 8 is a flowchart illustrating a writing operation of the main memory unit of the method for interfacing between the CPU and the main memory unit illustrated in FIG. 7, and FIGS. 9 through 11 are flowcharts illustrating an operation of converting writing operation signals of FIG. 8 into electrical signals and transmitting the electrical signals to a first E/O converter, and FIG. 12 is a flowchart illustrating an operation of converting electrical signals of FIG. 8 into writing operation signals and transmitting the writing operation signals to a memory controller, and FIG. 13 is a flowchart illustrating an operation of converting writing operation response signals of FIG. 8 into serial signals and transmitting the serial signals to a second E/O converter, and FIG. 14 is a flowchart illustrating an operation of processing the writing operation response signals of FIG. 8.

The shared cache memory unit 230 of the CPU 200 inputs writing operation signals including a memory address, memory control information, and memory writing data into the master optical connection protocol engine 110 so that the writing operation of the main memory unit 300 can be performed. In this case, the shared cache memory unit 230 inputs the writing operation signals in the form of electrical signals into the master optical connection protocol engine 110. Here, the memory address is a memory address having a length of a region of the memory address that the CPU 200 may access. The memory control information includes signals indicating a writing operation, whether to perform a burst operation of data, i.e., signals for determining the length of data, and mask information that indicates a portion of the data where the writing operation will be actually performed.

If the writing operation signals for the writing operation of the main memory unit 300 are input from the shared cache memory unit 230 (S200; YES), the master optical connection protocol engine 110 converts the received writing operation signals into electrical signals and transmits the electrical signals to the first E/O converter 130 (S210). In this case, the master optical connection protocol engine 110 converts the electrical signals that are parallel signals into serial signals and transmits the serial signals to the first E/O converter 130. This will now be described in more detail with reference to FIG. 9.

The first packet generation module 111 generates a packet header and packet data based on the received writing operation signals (S211). This will now be described with reference to FIG. 10.

The first packet generation module 111 checks whether redundant spaces are present in the packet transmission header buffer module 112 and the packet transmission data buffer module 113 (S212). That is, the first packet generation module 111 checks a space of the packet transmission header buffer module 112 in which data can be stored, and a space of the packet transmission data buffer module 113 in which data can be stored.

If the redundant spaces are present in the packet transmission header buffer module 112 and the packet transmission data buffer module 113 (S213; YES), the first packet generation module 111 generates a packet header and packet data based on writing operation signals (S214). The first packet generation module 111 generates the packet header and the packet data based on the received writing operation signals. In this case, the first packet generation module 111 generates the packet header including the memory address, a field that indicates writing operation signals, a length of data, mask information of the data, and an address of a packet data buffer module. Here, the address of the packet data buffer module is an address of a region in which packet data associated with the contents of the packet header is actually stored in the packet data buffer module.

The first packet generation module 111 stores the generated packet header and packet data (S215). That is, the first packet generation module 111 stores the generated packet header in the packet header buffer module and stores the generated packet data in the packet data buffer module. In this case, the first packet generation module 111 stores the packet header and the packet data and adjusts subsequent operation control signals so that, when several pieces of data are transmitted, subsequent data can be input or when only one piece of data is transmitted, subsequent access can be continuously performed.

The first packet generation module 111 adjusts the subsequent operation control signals if no redundant space is present in the master packet transmission header buffer or in the master packet transmission data buffer and does not immediately execute subsequent data or perform subsequent access in the shared cache memory unit 130 but waits for a current operation (S216).

The packet sequence and CRC generation module 114 generates packets based on the packet header and the packet data that are generated by the first packet generation module 111 (S217). This will now be described in more detail with reference to FIG. 11.

If storing of the packet header and the packet data that are generated by the first packet generation module 111 is finished, the packet sequence and CRC generation module 114 generates a packet sequence (S221). That is, the packet sequence and CRC generation module 114 recognizes that data are present in the packet transmission header buffer and the packet transmission data buffer if an operation of storing the packet header and the packet data in the packet transmission header buffer and the packet transmission data buffer is finished. Accordingly, the packet sequence and CRC generation module 114 generates the packet sequence.

The packet sequence and CRC generation module 114 detects the packet header stored in the packet header buffer module (S222). That is, the packet sequence and CRC generation module 114 detects the packet header including a memory address, a field indicating writing operation signals, a length of data, mask information of the data, and an address of the packet data buffer module from the packet header buffer module.

The packet sequence and CRC generation module 114 detects the packet data based on the detected packet header (S223). That is, the packet sequence and CRC generation module 114 detects the address of the packet data buffer module included in the packet header that has been already detected. The packet sequence and CRC generation module 114 detects the packet data stored in a region corresponding to the detected address of the packet data buffer module.

The packet sequence and CRC generation module 114 generates a packet CRC based on the packet header and the packet data that have been already detected (S224).

The packet sequence and CRC generation module 114 generates packets by connecting the detected packet header and packet data and the packet CRC (S225).

The packet sequence and CRC generation module 114 transmits the generated packets to the first packet data serialization module 115 (S226). The packet sequence and CRC generation module 114 transmits information regarding the reception of the packets to the packet checking module 119 and then is maintained in a standby state (S227).

The first packet data serialization module 115 serializes the packets based on the packet sequence generated by the packet sequence and CRC generation module 114 and generates serial signals (S218). In this case, the first packet data serialization module 115 serializes the packets by a bandwidth that may be processed by the first E/O converter 130. Here, when the bandwidth that may be processed by the first E/O converter 130 is smaller than a bandwidth that may be processed by the master optical connection protocol engine 110, a plurality of first packet data serialization modules 115 may be configured and may serialize the packets to be suitable for the bandwidth that may be processed by the master optical connection protocol engine 110.

The first packet data serialization module 115 transmits the serial signals that have been already generated, to the first E/O converter 130 (S219).

The first E/O converter 130 converts the electrical signals received from the master optical connection protocol engine 110 into optical signals and transmits the optical signals to the second E/O converter 150 (S230). That is, the first E/O converter 130 converts the serial signals received from the master optical connection protocol engine 110 into optical signals and transmits the optical signals to the second E/O converter 150.

The second E/O converter 150 converts the optical signals transmitted from the first E/O converter 130 into electrical signals and transmits the electrical signals to the slave optical connection protocol engine 170 (S235). That is, the second E/O converter 150 converts the optical signals into electrical signals and detects serial signals. The second E/O converter 150 transmits the detected serial signals to the slave optical connection protocol engine 170.

The slave optical connection protocol engine 170 converts the electrical signals received from the second E/O converter 150 into writing operation signals and transmits the writing operation signals to the memory controller 190 (S240). That is, the slave optical connection protocol engine 170 converts the serial signals received from the second E/O converter 150 into writing operation signals that are parallel signals and transmits the writing operation signals to the memory controller 190. This will now be described in more detail with reference to FIG. 12.

If the second packet data parallelization module 171 receives the serial signals corresponding to the writing operation signals (S241; YES), the second packet data parallelization module 171 converts the serial signals received from the second E/O converter 150 into parallel signals (S242). The second packet data parallelization module 171 transmits the converted parallel signals to the packet checking and translation module 173.

The packet checking and translation module 173 determines whether the parallel signals are normally received, based on a sequence and a CRC of the received parallel signals (S243). In this case, the packet checking and translation module 173 determines whether the parallel signals are damaged or redundantly received, based on the sequence and the CRC of the parallel signals.

If it is determined that the parallel signals are normally received (S244; YES), the packet checking and translation module 173 generates writing operation signals based on the received parallel signals (S245). That is, the packet checking and translation module 173 generates writing operation signals including a memory address, memory control information, and memory writing data by using the parallel signals that are normally received.

The packet checking and translation module 173 transmits the generated writing operation signals to the memory controller 190 (S246). In this case, the packet checking and translation module 173 transmits several pieces of data to the memory controller 190 based on subsequent operation control signals if several pieces of data are present.

The packet checking and translation module 173 terminates processing of the parallel signals if the packets are not normally received (S247). That is, the packet checking and translation module 173 discards the packets and performs processing of subsequent parallel signals if the parallel signals are damaged or redundantly received.

The memory controller 190 has access to the main memory unit 300 and performs a writing operation based on the received writing operation signals (S250).

The memory controller 190 transmits writing operation response signals with respect to the writing operation signals to the slave optical connection protocol engine 170 (S255). In this case, the memory controller 190 transmits writing operation completion signals or writing operation error signals as writing operation response signals.

The slave optical connection protocol engine 170 converts the writing operation response signals received from the memory controller 190 into serial signals and transmits the serial signals to the second E/O converter 150 (S260). This will now be described in more detail with reference to FIG. 13.

If the packet checking and translation module 173 receives the writing operation response signals from the memory controller 190 (S261; YES), the packet checking and translation module 173 transmits the writing operation response signals to the second packet generation module 175 (S262).

The second packet generation module 175 generates writing operation response packets corresponding to the received writing operation response signals (S263).

The second packet generation module 175 transmits the generated writing operation response signals to the second packet data serialization module 177 (S264). In this case, the second packet generation module 175 transmits writing operation completion packets in the form of parallel signals to the second packet data serialization module 177.

The second packet data serialization module 177 serializes the parallel signals and transmits the serialized signals to the second E/O converter 150 (S265). In this case, the second packet data serialization module 177 transmits serial signals obtained by serializing the parallel signals to the second E/O converter 150. When a bandwidth of the memory controller 190 is larger than that of the second E/O converter 150, several second E/O converters 150 may be used.

The second E/O converter 150 converts the serial signals into optical signals and transmits the optical signals to the first E/O converter 130 (S270).

The first E/O converter 130 converts the received optical signals into electrical signals and transmits the electrical signals to the master optical connection protocol engine 110 (S275).

The master optical connection protocol engine 110 performs processing on the received writing operation response signals (S280). This will now be described in more detail with reference to FIG. 14.

If the master optical connection protocol engine 110 receives the writing operation response signals within a setting time (S281; YES), the master optical connection protocol engine 110 converts the writing operation response signals received from the first E/O converter 130 into parallel signals (S282).

The master optical connection protocol engine 110 checks the packet sequence and the CRC from the converted parallel signals and generates packet reception information (S283). In this case, the master optical connection protocol engine 110 generates packet reception information including writing operation completion signals or writing operation error signals. Here, the slave optical connection protocol engine 170 generates writing operation error signals and transmits the writing operation error signals to the master optical connection protocol engine 110 if a problem occurs in subsequent operation control signals or a result of checking a sequence and a CRC of the writing operation signals.

If the master optical connection protocol engine 110 determines writing operation completion because of the writing operation completion signals included in the generated packet reception information (S284; YES), the master optical connection protocol engine 110 terminates processing of the writing operation signals and processes subsequent operation control signals (S285). That is, the master optical connection protocol engine 110 reads access information regarding subsequent memory writing or reading from the packet transmission header buffer and the packet transmission data buffer and transmits next packets to the memory controller 190 if the writing operation signals are normally processed.

If the master optical connection protocol engine 110 determines a writing operation error because of writing operation error signals included in the generated packet reception information or does not receive the writing operation response signals within the setting time, the master optical connection protocol engine 110 performs the above-described operations repeatedly and retransmits the writing operation signals to the memory controller 190 (S286). In this case, if the master optical connection protocol engine 110 does not receive writing operation response signals within the setting time, a problem may occur in a line in which the master optical connection protocol engine 110 transmits the writing operation signals to the slave optical connection protocol engine 170 or a problem may occur in a line in which the master optical connection protocol engine 110 receives the writing operation response signals that are generated and transmitted by the slave optical connection protocol engine 170.

Figure 15:
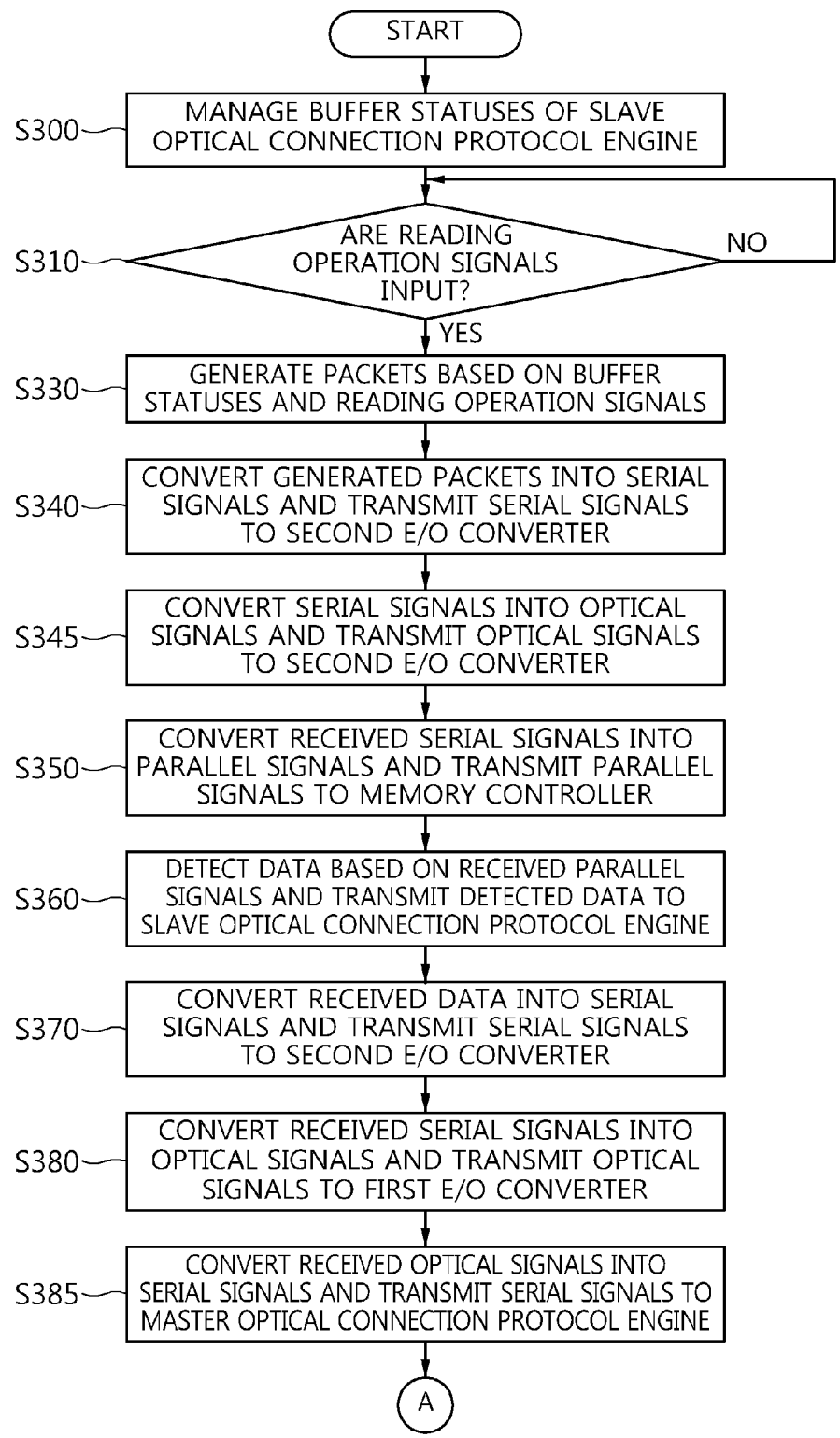
FIGS. 15 and 16 are flowcharts illustrating a reading operation of the main memory unit of the method for interfacing between the CPU and the main memory unit of FIG. 7.
Figure 16:
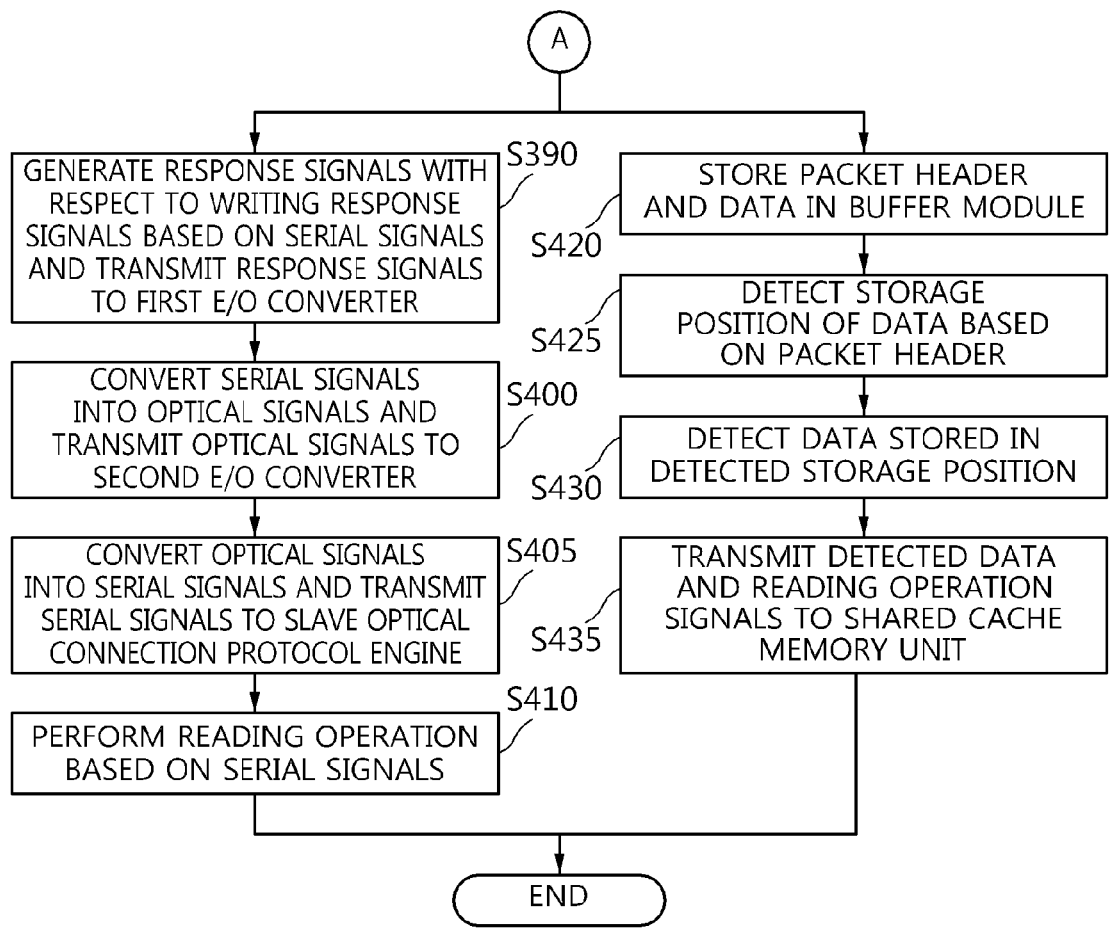
Figure 17:
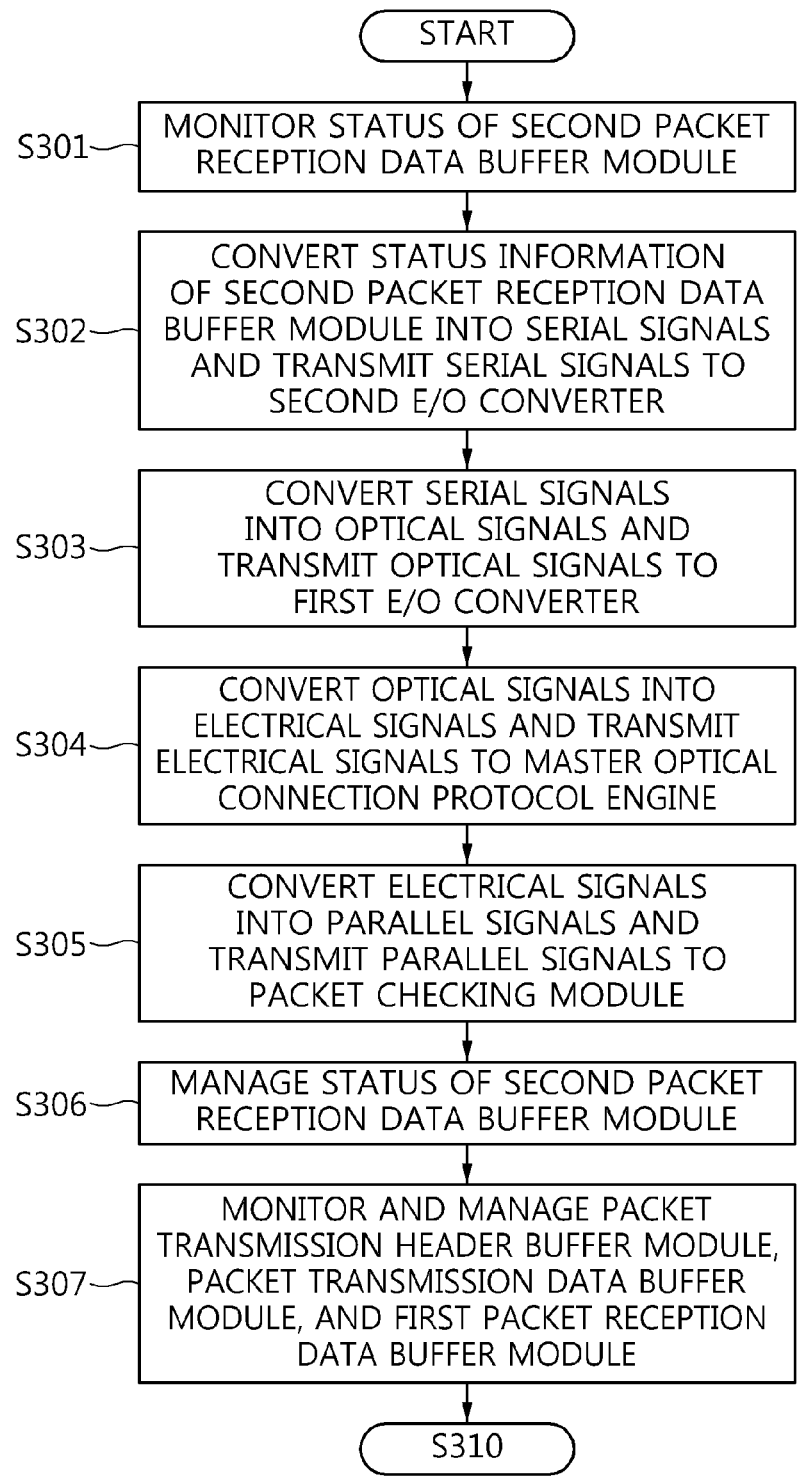
FIG. 17 is a flowchart illustrating a buffer status management operation of FIG. 15.
Figure 18:
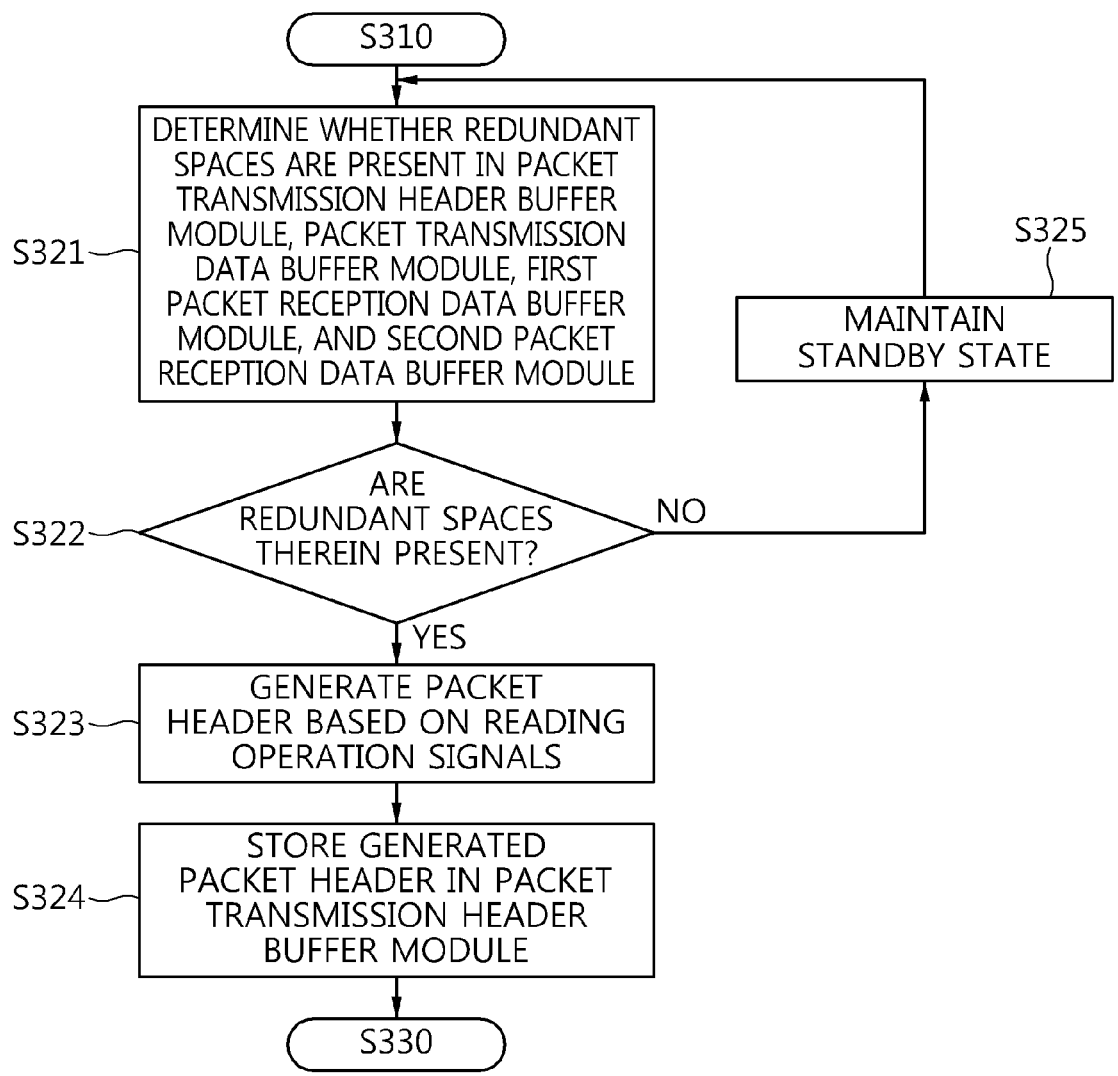
FIG. 18 is a flowchart illustrating an operation of generating packets based on a buffer status and reading operation signals of FIG. 15.
Figure 19:
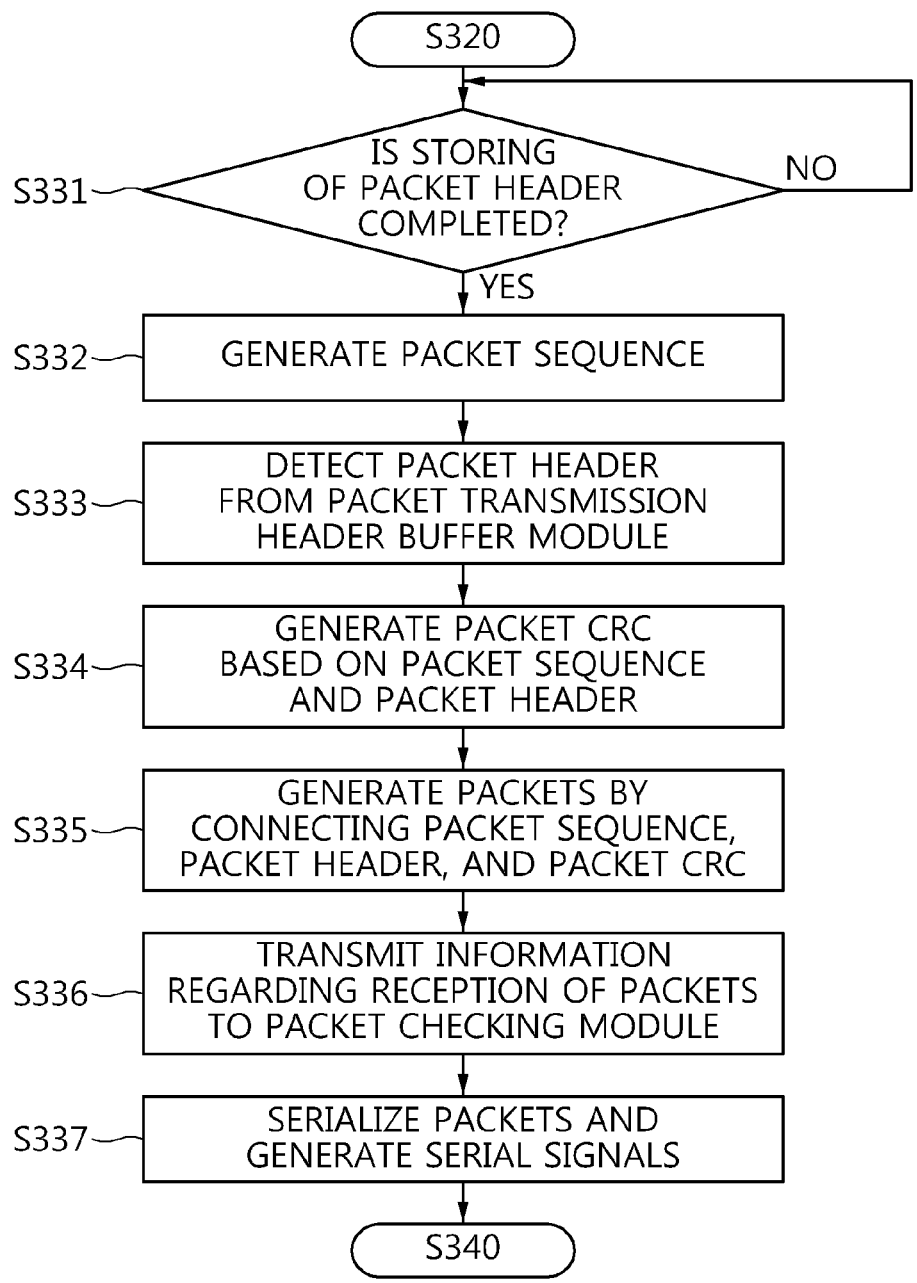
FIG. 19 is a flowchart illustrating an operation of converting the packets of FIG. 15 into serial signals and transmitting the serial signals to the first E/O converter.
Figure 20:
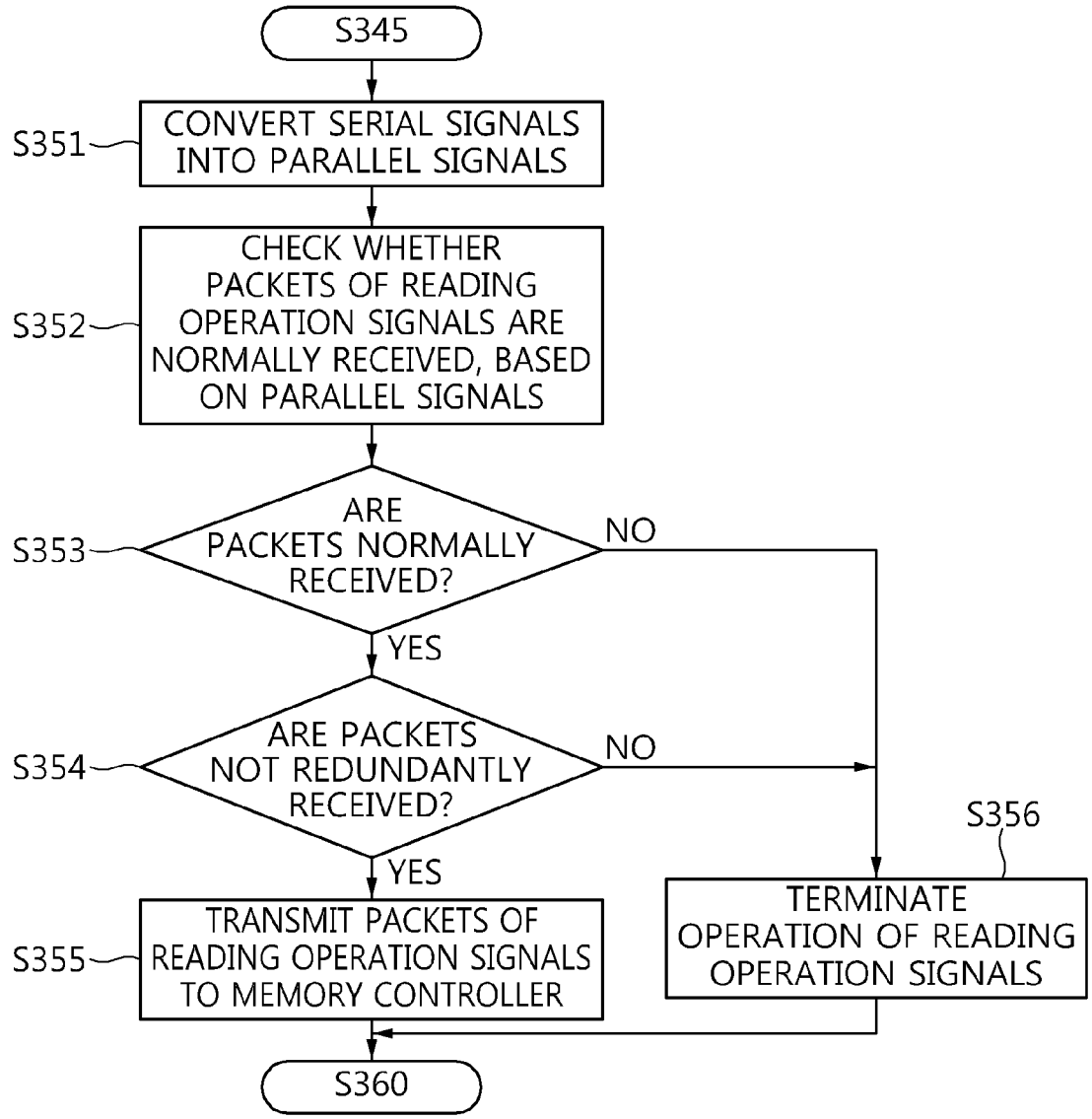
FIG. 20 is a flowchart illustrating an operation of converting the serial signals of FIG. 15 into parallel signals and transmitting the parallel signals to a memory controller.
Figure 21:
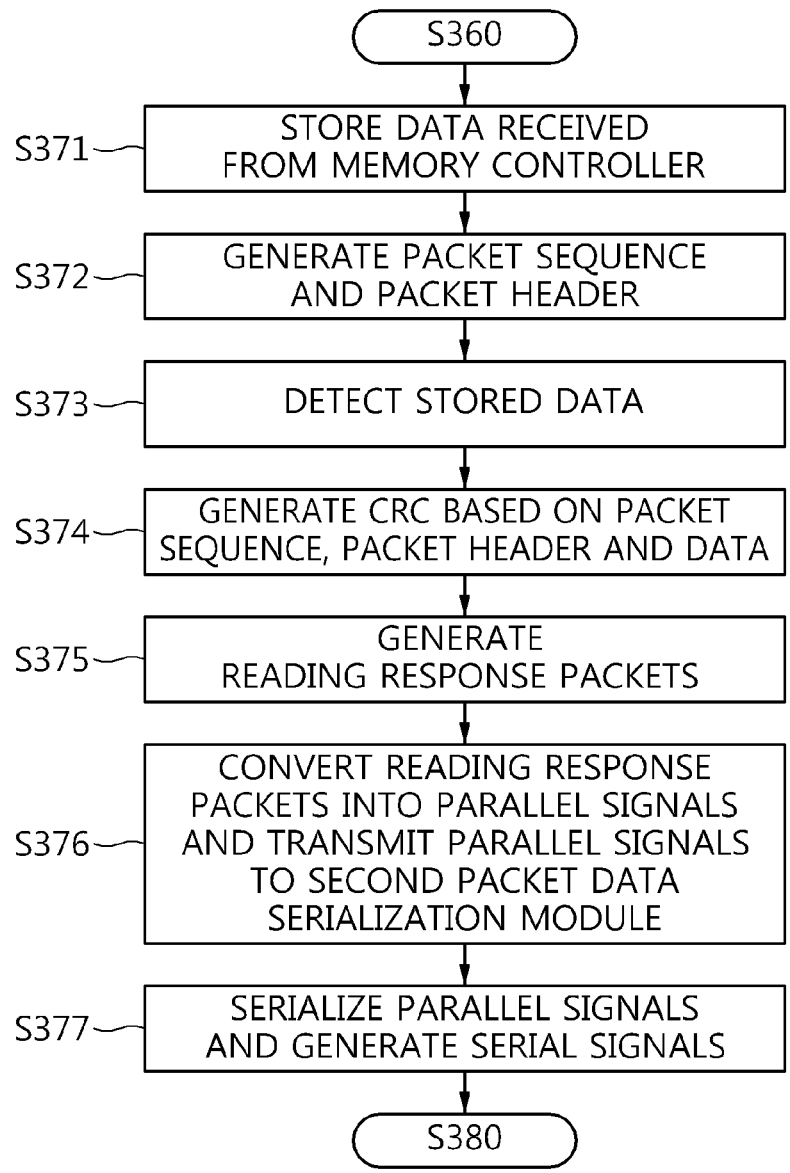
FIG. 21 is a flowchart illustrating an operation of converting data of FIG. 15 into serial signals and transmitting the serial signals to the second E/O converter.
Figure 22:
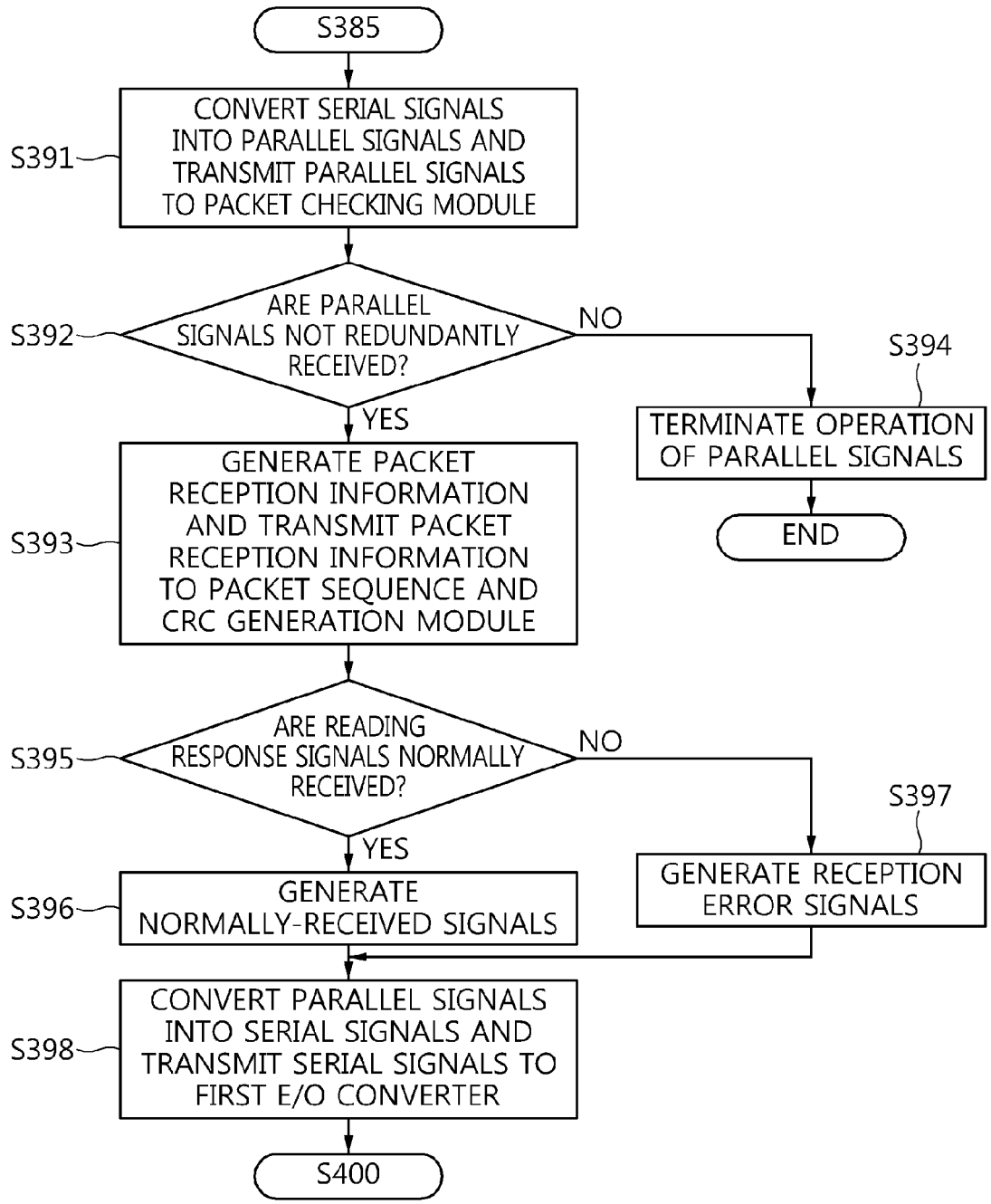
FIG. 22 is a flowchart illustrating an operation of generating response signals of FIG. 16 and transmitting the response signals to the first E/O converter.
Figure 23:
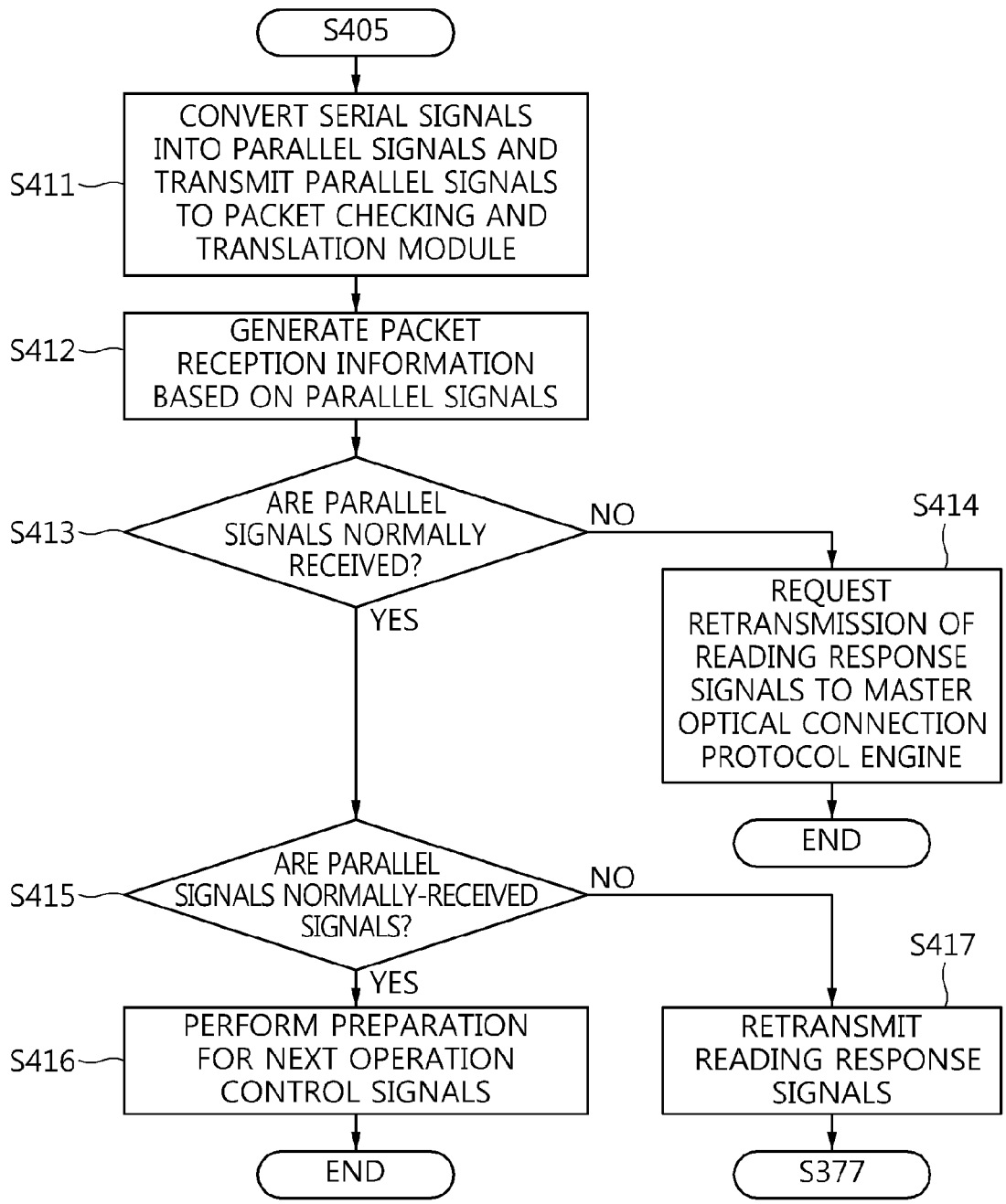
FIG. 23 is a flowchart illustrating an operation of performing a reading operation according to the serial signals of FIG. 16.

Hereinafter, a reading operation of the main memory unit of the method for interfacing between the CPU and the main memory unit illustrated in FIG. 7 will be described in detail with reference to the accompanying drawings. FIGS. 15 and 16 are flowcharts illustrating a reading operation of the main memory unit of the method for interfacing between the CPU and the main memory unit of FIG. 7, and FIG. 17 is a flowchart illustrating a buffer status management operation of FIG. 15, and FIG. 18 is a flowchart illustrating an operation of generating packets based on a buffer status and reading operation signals of FIG. 15, and FIG. 19 is a flowchart illustrating an operation of converting the packets of FIG. 15 into serial signals and transmitting the serial signals to the first E/O converter, and FIG. 20 is a flowchart illustrating an operation of converting the serial signals of FIG. 15 into parallel signals and transmitting the parallel signals to a memory controller, and FIG. 21 is a flowchart illustrating an operation of converting data of FIG. 15 into serial signals and transmitting the serial signals to the second E/O converter, and FIG. 22 is a flowchart illustrating an operation of generating response signals of FIG. 16 and transmitting the response signals to the first E/O converter, and FIG. 23 is a flowchart illustrating an operation of performing a reading operation according to the serial signals of FIG. 16.

The master optical connection protocol engine 110 manages buffer statuses of the master optical connection protocol engine 110 and buffer states of the slave optical connection protocol engine 170 (S300). The master optical connection protocol engine 110 manages statuses of the packet transmission header buffer module 112, the packet reception header buffer module 117, the first packet reception data buffer module 118, and the second packet reception data buffer module 179. In this case, the master optical connection protocol engine 110 manages statuses of redundant spaces of the buffer modules. This will now be described in more detail with reference to FIG. 17.

The second packet generation module 175 monitors a status of the second packet reception data buffer module 179 (S301). In this case, the second packet generation module 175 transmits status information including a redundant space of the second packet reception data buffer module 179 to the second packet data serialization module 177 cyclically.

The second packet data serialization module 177 serializes the status information received from the second packet generation module 175, generates serial signals and transmits the serial signals to the second E/O converter 150 (S302).

The second E/O converter 150 converts the received serial signals into optical signals and transmits the optical signals to the first E/O converter 130 (S303).

The first E/O converter 130 converts the received optical signals into electrical signals and transmits the electrical signals to the master optical connection protocol engine 110 (S304). The first E/O converter 130 converts the received optical signals into serial signals that are electrical signals. The first E/O converter 130 transmits the converted serial signals to the first packet data parallelization module 120 of the master optical connection protocol engine 110.

The first packet data parallelization module 120 converts the received serial signals into parallel signals and transmits the parallel signals to the packet checking module 119 (S305).

The packet checking module 119 manages a status of the second packet reception data buffer module 179 of the slave optical connection protocol engine 170 based on the received parallel signals (S306).

The packet checking module 119 monitors statuses of the packet transmission header buffer module 112, the packet reception header buffer module 117, and the first packet reception data buffer module 118 and manages them (S307). That is, the packet checking module 119 monitors and manages status information including redundant spaces of the packet transmission header buffer module 112, the packet reception header buffer module 117, and the first packet reception data buffer module 118.

The master optical connection protocol engine 110 receives reading operation signals from the shared cache memory unit 230 (S310). In this case, the reading operation signals include a memory address and memory control information. Here, the memory address is received by the entire length of a region of the memory address that the main memory unit 200 may access. The memory control information includes signals indicating a reading operation, whether to perform a burst operation of data for determining a length of data, and mask information indicating a portion where the reading operation will occur actually.

The master optical connection protocol engine 110 generates packets based on its buffer status, a buffer status of the slave optical connection protocol engine 170, and reading operation signals (S320). This will now be described in more detail with reference to FIG. 18.

The first packet generation module 111 determines statuses of the packet transmission header buffer module 112, the packet reception header buffer module 117, and the first packet reception data buffer module 118 and whether a redundant space is present in the second packet reception data buffer module 179 (S321).

If redundant spaces are present in all buffer modules of the master optical connection protocol engine 110 (S322; YES), the first packet generation module 111 generates a packet header based on the reading operation signals (S323). In this case, the first packet generation module 111 generates the packet header including an address of memory, a field indicating writing, a length of data, and mask information of the data.

The first packet generation module 111 stores the packet header that has been already generated, in the packet transmission header buffer module 112 (S324). In this case, the first packet generation module 111 performs an operation of storing the packet header in the packet transmission header buffer module 112 and adjusts subsequent operation control signals so that subsequent access can be continuously performed.

The first packet generation module 111 is maintained in a standby state, and if redundant spaces are insufficient in at least one of the buffer modules (S325). That is, if redundant spaces are insufficient in at least one of the packet transmission header buffer module 112, the packet reception header buffer module 117, the first packet reception data buffer module 118, and the second packet reception data buffer module 179, the first packet generation module 111 adjusts the subsequent operation control signals and does not immediately perform subsequent access in the shared cache memory unit 230 and waits for a current operation.

The master optical connection protocol engine 110 converts the generated packets into serial signals and transmits the serial signals to the first E/O converter 130 (S330). This will now be described in more detail with reference to FIG. 19.

If storing of the packet header in the first packet generation module 111 is finished (S331; YES), the packet sequence and CRC generation module 114 generates a packet sequence (S332).

The packet sequence and CRC generation module 114 detects the packet header from the packet transmission header buffer module 112 (S333).

The packet sequence and CRC generation module 114 generates a packet CRC based on the packet sequence and the packet header (S334).

The packet sequence and CRC generation module 114 generates one packet by connecting the packet sequence, the packet header, and the packet CRC (S335). The packet sequence and CRC generation module 114 transmits the generated packets to the first packet data serialization module 115.

The packet sequence and CRC generation module 114 transmits information regarding transmission of the generated packets to the packet checking module 119 (S336). Subsequently, the packet sequence and CRC generation module 114 is maintained in a standby state.

The first packet data serialization module 115 serializes the received packets and generates serial signals (S337). That is, the first packet data serialization module 115 attempts serialization of the received packets by a bandwidth that may be processed by the first E/O converter 130. In this case, when a bandwidth that may be processed by the first E/O converter 130 is smaller than a bandwidth that may be processed by the master optical connection protocol engine 110, a plurality of packet data serialization modules may be configured and may serialize the packets to be suitable for the bandwidth that may be processed by the master optical connection protocol engine 110.

The first E/O converter 130 converts the serial signals into optical signals and transmits the optical signals to the second E/O converter 150 (S340), and the second E/O converter 150 converts the received optical signals into serial signals and transmits the serial signals to the slave optical connection protocol engine 170 (S345)

The slave optical connection protocol engine 170 converts the received serial signals into parallel signals and transmits the parallel signals to the memory controller 190 (S350). This will now be described in more detail with reference to FIG. 20.

The second packet data parallelization module 171 converts the received serial signals into parallel signals (S351). That is, the second packet data parallelization module 171 converts packets of reading operation signals in the form of serial signals into packets in the form of parallel signals. The second packet data parallelization module 171 transmits the converted parallel signals to the packet checking and translation module 173.

The packet checking and translation module 173 detects the packet sequence and the CRC from the received parallel signals and checks whether the packets of the reading operation signals are normally received (S532).

If it is determined that the packets are normally received (S353; YES), the packet checking and translation module 173 checks whether the packets are redundantly received. If it is determined that the packets are not redundantly received (S354; YES), the packet checking and translation module 173 transmits the received packets of the reading operation signals to the memory controller 190 (S355). In this case, the packet checking and translation module 173 transmits the packets including a memory address and memory control information to the memory controller 190. Also, the packet checking and translation module 173 transmits the packet reception information to the second packet generation module 175.

The packet checking and translation module 173 does not transmit the packets to the memory controller 190 but terminates an operation of the reading operation signals if the packets are packets that are redundantly received (S356).

The memory controller 190 detects the data based on the received parallel signals and transmits the detected data to the slave optical connection protocol engine 170 (S360). That is, the memory controller 190 detects the data based on the memory address and the memory control information included in the received packets. The memory controller 190 transmits reading data control signals together with the detected data to the slave optical connection protocol engine 170.

The slave optical connection protocol engine 170 converts the data received from the memory controller 190 into serial signals and transmits the serial signals to the second E/O converter 150 (S370). This will now be described in more detail with reference to FIG. 21.

The second packet reception data buffer module 179 stores the data received from the memory controller 190 (S371).

The second packet generation module 175 generates a packet sequence and a packet header (S372). That is, the second packet generation module 175 transmits storing completion signals to the packet checking and translation module 173 if storing of the data in the second packet reception data buffer module 179 is finished. The second packet generation module 175 generates the packet sequence and the packet header based on information regarding the reception of the packets.

The second packet generation module 175 detects the data stored in the second packet reception data buffer module 179 (S373). That is, the second packet generation module 175 detects the data stored in the second packet reception data buffer module 179 according to the reading operation signals.

The second packet generation module 175 generates a CRC based on the packet sequence, the packet header, and the detected data (S374).

The second packet generation module 175 generates reading response packets by connecting the packet sequence, the packet header, the date, and the CRC (S375).

The second packet generation module 175 converts the generated reading response packets into parallel signals and transmits the parallel signals to the second packet data serialization module 177 (S376).

The second packet data serialization module 177 serializes the parallel signals and generates serial signals (S377). The second packet data serialization module 177 transmits the generated serial signals to the second E/O converter 150. In this case, if the bandwidth of the memory controller 190 is larger than that of the second E/O converter 150, a plurality of second packet data serialization modules 177 may be configured to transmit the generated serial signals to the second E/O converter 150.

The second E/O converter 150 converts the received serial signals into optical signals and transmits the optical signals to the first E/O converter 130 (S380), and the first E/O converter 130 converts the received optical signals into serial signals and transmits the serial signals to the master optical connection protocol engine 110 (S385).

The master optical connection protocol engine 110 generates response signals with the reading response signals based on the received serial signals and transmits the response signals to the first E/O converter 130 (S390). This will now be described in more detail with reference to FIG. 22.

The first packet data parallelization module 120 converts the received serial signals into parallel signals and transmits the parallel signals to the packet checking module 119 (S391). That is, the first packet data parallelization module 120 converts packets in the form of serial signals received from the first E/O converter 130, i.e., reading response signals, into parallel signals. The first packet data parallelization module 120 transmits the converted parallel signals to the packet checking module 119.

The packet checking module 119 detects the packet sequence and the CRC from the parallel signals and checks whether the parallel signals are redundantly received. In this case, if it is checked that the parallel signals are not redundantly received, i.e., reading response signals (S392; YES), the packet checking module 119 generates packet reception information and transmits the generated packet reception information to the packet sequence and CRC generation module 114 (S393). In this case, the packet checking module 119 generates the packet reception information including a packet sequence and a CRC.

The packet checking module 119 terminates an operation of the parallel signals if the parallel signals are redundantly received (S394).

The packet sequence and CRC generation module 114 determines whether the reading response signals are normally received, based on the packet reception information received from the first packet checking module 119. In this case, the packet sequence and CRC generation module 114 determines whether the reading response signals are normally received, based on the packet sequence and CRC included in the packet reception information. If it is determined by the packet sequence and CRC generation module 114 that the reading response signals are normally received (S395; YES), the packet sequence and CRC generation module 114 generates normally-received signals with respect to the reading response signals and transmits the generated normally-received signals to the first packet data serialization module 115 (S396). That is, if it is determined by the packet sequence and CRC generation module 114 that the reading response signals are normally received, the reading operation signals that have been already transmitted are normally transmitted to the main memory unit 300. Thus, the packet sequence and CRC generation module 114 reads subsequent memory access information from the packet transmission header buffer module 112 and the packet transmission data buffer module 113 and thus is in a state in which the packet sequence and CRC generation module 114 can transmit next packets. The packet sequence and CRC generation module 114 generates normally-received signals including the contents that memory reading response packets have been properly received, so as to inform information regarding the reception of the memory reading response packets before next memory access information is read, to the slave optical connection protocol engine 170. The packet sequence and CRC generation module 114 converts the normally-received signals that have been already generated, into parallel signals and transmits the parallel signals to the first packet data serialization module 115.

If it is determined in Operation S395 that the reading response signals are abnormally received, the packet sequence and CRC generation module 114 generates reception error signals of the reading response signals and transmits the reception error signals of the reading response signals to the first packet data serialization module 115 (S397). That is, the packet sequence and CRC generation module 114 generates reception error signals indicating that an error (a problem) occurs in the received reading response signals, so as to request retransmission of the reading response signals from the slave optical connection protocol engine 170. The packet sequence and CRC generation module 114 converts the generated reception error signals into parallel signals and transmits the parallel signals to the first packet data serialization module 115.

The first packet data serialization module 115 converts the parallel signals into serial signals and transmits the serial signals to the first E/O converter 130 (S398). That is, the first packet data serialization module 115 serializes normally-received signals or reception error signals with respect to the reading response signals received from the packet sequence and CRC generation module 114, and converts the serialized normally-received signals or reception error signals into serial signals. The first packet data serialization module 115 transmits the converted serial signals to the first E/O converter 130.

The first E/O converter 130 converts the received serial signals into optical signals and transmits the optical signals to the second E/O converter 150 (S400), and the second E/O converter 150 converts the received optical signals into serial signals and transmits the serial signals to the slave optical connection protocol engine 170 (S405).

The slave optical connection protocol engine 170 performs a reading operation according to the serial signals received from the second E/O converter 150 (S410). That is, the slave optical connection protocol engine 170 performs one reading operation while terminating the reading operation according to the serial signals or retransmitting the reading response signals. This will now be described in more detail with reference to FIG. 23.

The second packet data parallelization module 171 converts the serial signals received from the second E/O converter 150 into parallel signals and transmits the parallel signals to the packet checking and translation module 173 (S411). That is, the second packet data parallelization module 171 converts response signals in the form of the received serial signals, i.e., normally-received signals or reception error signals, into parallel signals and transmits the parallel signals to the packet checking and translation module 173.

The packet checking and translation module 173 checks a packet sequence and CRC of the parallel signals and generates packet reception information (S412). The packet checking and translation module 173 generates packet reception information indicating a reception error if an error occurs in the packet sequence or CRC, and if no error occurs in the packet sequence or CRC, the packet checking and translation module 173 generates packet reception information indicating normal reception. The packet checking and translation module 173 transmits the generated packet reception information and the parallel signals, i.e., the response signals to the second packet generation module 175.

The second packet generation module 175 determines whether the parallel signals, i.e., the response signals are normally received, based on the packet reception information. In this case, the second packet generation module 175 determines that a reception error occurs in the parallel signals if the second packet generation module 175 receives the packet reception information indicating the reception error. If it is determined that the reception error occurs in the parallel signals (S413; NO), the second packet generation module 175 requests retransmission of the reading response signals to the master optical connection protocol engine 110 (S414). That is, the second packet generation module 175 generates signals (or packets) that request retransmission of the response signals and transmits the signals (or packets) in the form of parallel signals to the second packet data serialization module 177. The second packet data serialization module 177 converts the parallel signals into serial signals and transmits the serial signals to the second E/O converter 150. The second E/O converter 150 transmits optical signals to the first E/O converter 130, and the first E/O converter 130 converts the optical signals into serial signals and transmits the serial signals to the master optical connection protocol engine 110.

If it is determined that the parallel signals are normally received and are normally-received signals (S415; YES), the second packet generation module 175 performs preparation for next operation control signals (S416). That is, since it was ascertained that memory reading response packets that are in process at present are received by the master optical connection protocol engine 110 the second packet generation module 175, the second packet generation module 175 prepares to generate writing response packets or reading response packets with the packet reception information transmitted from the packet checking and translation module 173 and the contents of the packet reception data buffer module.

If the received packet reception information are error response signal packets, the second packet generation module 175 retransmits the reading response signals to the second packet data serialization module 177 (S417). That is, if the second packet generation module 175 receives the error response signal packets, the second packet generation module 175 retransmits the reading response signals that have been already transmitted. The second packet generation module 175 waits until it receives packets indicating that the memory reading response packets have been properly transmitted, i.e., response packets with response to the reading response signals. In this case, if the second packet generation module 175 does not receive the response packets with respect to the reading response signals within a setting time, the second packet generation module 175 determines that the reading response signals are not normally transmitted to the master optical connection protocol engine 110. Accordingly, the second packet generation module 175 retransmits the reading response signals by repeatedly performing the above-described process. Here, if the second packet generation module 175 does not receive the response packets with respect to the reading response signals within the setting time, a problem may occur in a transmission line in which the reading response packets are transmitted or in a transmission line in which the response packets indicating that the reading response packets have been received, are received.

Also, the packet checking module 119 stores the packet header and the data in the buffer module (S420). That is, the packet checking module 119 stores the packet header included in the reading response signals received simultaneously with transmission of the packet reception information in the packet reception header buffer module 117. The packet checking module 119 stores the packet data included in the received reading response signals in the first packet reception data buffer module 118. Here, the packet header includes a length of packets and a position where data corresponding to the packet header is stored in the first packet reception data buffer module 118.

If storing of the packet header and the data is finished, the packet translation module 116 detects the storage position of the data based on the stored packet header (S425). That is, the packet translation module 116 detects the packet header stored in the packet reception header buffer module 117. The packet translation module 116 detects the storage position of the data from the detected packet header.

The packet translation module 116 detects the data from the first packet reception data buffer module 118 based on the detected storage position (S430). That is, the packet translation module 116 detects data stored in the storage position, i.e., data detected from the main memory unit 300 according to reading operation signals, from among pieces of data stored in the first packet reception data buffer module 118.

The packet translation module 116 transmits the detected data together with the reading operation signals to the shared cache memory unit 230 (S435).

As described above, the present invention provides an apparatus and method for interfacing between a main memory unit and a main memory unit, whereby a shared cache memory unit and the main memory unit that receive operation control signals from a plurality of cores, are connected to each other by using one optical signals line so that the number of signal transmission lines for data transmission/reception between the shared cache memory unit and the main memory unit can be minimized.

The present invention also provides an apparatus and method for interfacing between a main memory unit and a main memory unit, whereby the shared cache memory unit and the main memory unit that receive the operation control signals from the plurality of cores, are connected to each other by using one optical signals line so that the number of channels of the main memory units can be increased and a required capacity of memory can be increased.

The present invention also provides an apparatus and method for interfacing between a main memory unit and a main memory unit, whereby the shared cache memory unit and the main memory unit that receive the operation control signals from the plurality of cores, are connected to each other by using one optical signals line so that distortion and interference of signals can be minimized.

The present invention also provides an apparatus and method for interfacing between a main memory unit and a main memory unit, whereby the shared cache memory unit and the main memory unit that receive the operation control signals from the plurality of cores, are connected to each other by using one optical signals line so that power consumption caused by interfacing between the CPU and the main memory unit can be minimized.

The present invention also provides an apparatus and method for interfacing between a main memory unit and a main memory unit, whereby a master optical connection protocol engine and a slave optical connection protocol engine perform reception error processing that occurs in interfacing between the CPU and the main memory unit so that safe data transmission/reception can be performed and data can be prevented from being damaged or skew between data signal transmission lines can be prevented in advance and a structure having no limitation in an extension distance can be provided.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for interfacing between a central processing unit (CPU) and a main memory unit, the apparatus comprising:
   a master optical connection protocol engine configured to convert operation control signals received from a shared cache memory unit of the CPU into serial signals;
   a first electrical-to-optical (E/O) converter configured to convert the serial signals converted by the master optical connection protocol engine into optical signals;
   a second E/O converter configured to convert the optical signals converted by the first E/O converter into electrical signals;
   a slave optical connection protocol engine configured to convert the electrical signals converted by the second E/O converter into operation control signals; and
   a memory controller configured to access to the main memory unit based on the operation control signals converted by the slave optical connection protocol engine.

2. The apparatus as set forth in claim 1, wherein the memory controller generates response signals based on a result of having access to the main memory unit according to the operation control signals, and
   the slave optical connection protocol engine converts parallel signals converted by the memory controller into electrical signals, and the second E/O converter converts the electrical signals converted by the slave optical connection protocol engine into optical signals, and the first E/O converter converts the optical signals converted by the second E/O converter into serial signals, and the master optical connection protocol engine converts the serial signals converted by the first E/O converter into parallel signals and transmits the parallel signals to the shared cache memory unit.

3. The apparatus as set forth in claim 1, wherein the master optical connection protocol engine comprises:

a first packet generation module configured to generate a packet header and packet data based on the operation control signals received from the shared cache memory unit;

a packet transmission header buffer module configured to store the packet header generated by the first packet generation module;

a packet transmission data buffer module configured to store the packet data generated by the first packet generation module;

a packet sequence and cyclic redundancy code (CRC) generation module configured to generate a packet sequence and a CRC based on the packet header and the packet data and generate operation control packets by connecting the packet header, the packet data, the packet sequence and the CRC; and a first packet data serialization module configured to convert the operation control packets into serial signals and transmit the serial signals to the first E/O converter.

4. The apparatus as set forth in claim 1, wherein the master optical connection protocol engine comprises:

a first packet data parallelization module configured to receive status information of buffer modules of the slave optical connection protocol engine as serial signals from the first E/O converter and convert the serial signals into parallel signals;

a packet checking module configured to manage the status information of the buffer modules of the slave optical connection protocol engine based on the parallel signals and manage status information of buffer modules of the master optical connection protocol engine;

a first packet generation module, if operation control signals are received from the shared cache memory unit, configured to determine whether redundant spaces are present in the buffer modules of the slave optical connection protocol engine and the buffer modules of the master optical connection protocol engine, based on the status information of the buffer modules of the slave optical connection protocol engine and the status information of the buffer modules of the master optical connection protocol engine, and if redundant spaces are present in the buffer modules of the slave optical connection protocol engine and the buffer modules of the master optical connection protocol engine, generate a packet header based on the operation control signals and store the generated packet header in the buffer modules of the master optical connection protocol engine;

a packet sequence and CRC generation module configured to generate a packet sequence and a CRC based on the packet header and the operation control signals and generate packets by connecting the packet sequence, the CRC, the packet header, and the operation control signals; and a first packet data serialization module configured to convert the packets into serial signals and transmit the serial signals to the first E/O converter.

5. The apparatus as set forth in claim 4, wherein the first packet data parallelization module receives response signals with respect to the serial signals from the first E/O converter and converts the response signals into parallel signals, and the packet checking module generates packet reception information based on the parallel signals, and the packet sequence and CRC generation module determines whether the parallel signals are normally received, based on the packet reception information and generates normally-received signals or reception error signals, and the first packet data serialization module converts the normally-received signals or the reception error signals into serial signals and transmits the serial signals to the first E/O converter.

6. The apparatus as set forth in claim 4, wherein the packet checking module stores the packet header and the packet data included in response signals in buffer modules based on the parallel signals received from the slave optical connection protocol engine, and the packet translation module detects the stored packet header, detects the packet data based on the packet header, and transmits the detected packet header and the detected packet data to the shared cache memory unit.

7. The apparatus as set forth in claim 1, wherein the slave optical connection protocol engine comprises:

a second packet data parallelization module configured to convert the electrical signals received from the second E/O converter into parallel signals; and a packet checking and translation module configured to determine whether the parallel signals are normally received and redundantly received, based on the packet sequence and CRC included in the converted parallel signals and transmit the parallel signals that are not redundantly received, among the normally-received parallel signals to the memory controller.

8. The apparatus as set forth in claim 7, wherein the packet checking and translation module receives response signals with respect to the operation control signals from the memory controller, and the slave optical connection protocol engine further comprises a second packet data serialization module configured to convert the response signals into serial signals and transmit the electrical signals to the second E/O converter.

9. The apparatus of claim 1, wherein the slave optical connection protocol engine comprises:

a second packet data parallelization module configured to convert the electrical signals received from the second E/O converter into parallel signals;

a packet checking and translation module configured to determine whether the operation control signals are normally received and redundantly received, based on the converted parallel signals and transmit the operation control signals that are not redundantly received, among the normally-received operation control signals to the memory controller;

a second packet reception data buffer module configured to receive data corresponding to the transmitted operation control signals from the memory controller and store the received data;

a second packet generation module configured to generate a packet sequence and a packet header based on the data stored in the second packet reception data buffer module, generate CRC based on the packet sequence, the packet header, and the data and generate response signals; and a second packet data serialization module configured to convert the response signals generated by the second packet generation module into serial signals and transmit the serial signals to the second E/O converter.

10. The apparatus as set forth in claim 9, wherein the packet checking and translation module generates packet reception information based on the parallel signals received from the second E/O converter, and the second packet generation module checks whether the parallel signals are normally received, based on the packet reception information and generates retransmission request signals of the response signals if an error occurs in receiving the parallel signals, and the second packet data serialization module converts the retransmission request signals into electrical signals and transmits the electrical signals to the second E/O converter.

11. A method for interfacing between a central processing unit (CPU) and a main memory unit, the method comprising:

converting operation control signals received from a shared cache memory unit of the CPU into serial signals by a master optical connection protocol engine;

converting the serial signals converted by the master optical connection protocol engine into optical signals by a first electrical-to-optical (E/O) converter;

converting the optical signals converted by the first E/O converter into electrical signals by a second E/O converter;

converting the electrical signals converted by the second E/O converter into operation control signals by a slave optical connection protocol engine; and having access to the main memory unit based on the operation control signals converted by the slave optical connection protocol engine by a memory controller.

12. The method as set forth in claim 11, further comprising:

generating response signals based on a result of having access to the main memory unit according to the operation control signals by the memory controller;

converting parallel signals converted by the memory controller into electrical signals by the slave optical connection protocol engine;

converting the electrical signals converted by the slave optical connection protocol engine into optical signals by the second E/O converter;

converting the optical signals converted by the second E/O converter into serial signals by the first E/O converter; and converting the serial signals converted by the first E/O converter into parallel signals and transmitting the parallel signals to the shared cache memory unit by the master optical connection protocol engine.

13. The method as set forth in claim 11, wherein the converting of the operation control signals into serial signals comprises:

generating a packet header and packet data based on the operation control signals received from the shared cache memory unit by the master optical connection protocol engine;

generating a packet sequence and a cyclic redundancy code (CRC) based on the packet header and the packet data by the master optical connection protocol engine;

generating operation control packets by connecting the packet header, the packet data, the packet sequence, and the CRC by the master optical connection protocol engine; and converting the operation control packets into serial signals and transmitting the serial signals to the first E/O converter by the master optical connection protocol engine.

14. The method as set forth in claim 11, further comprising:

converting the electrical signals received from the second E/O converter into parallel signals by the slave optical connection protocol engine;

determining whether the parallel signals are normally received and redundantly received, based on the packet sequence and CRC included in the parallel signals by the slave optical connection protocol engine; and transmitting the parallel signals that are determined not to be redundantly received, among the parallel signals determined to be normally received in the determination, to the memory controller by the slave optical connection protocol engine.

15. The method as set forth in claim 14, further comprising:

receiving response signals with respect to the electrical signals from the memory controller by the slave optical connection protocol engine; and converting the response signals into electrical signals and transmitting the serial signals to the second E/O converter by the slave optical connection protocol engine.

16. The method as set forth in claim 11, further comprising:

managing status information of buffer modules of the slave optical connection protocol engine and status information of buffer modules of the master optical connection protocol engine by the master optical connection protocol engine;

if the operation control signals are received from the shared cache memory unit, determining whether redundant spaces are present in the buffer modules of the slave optical connection protocol engine and the buffer modules of the master optical connection protocol engine, based on the status information of buffer modules of the slave optical connection protocol engine and the status information of buffer modules of the master optical connection protocol engine, by the master optical connection protocol engine;

if it is determined that redundant spaces are present in the buffer modules of the slave optical connection protocol engine and the buffer modules of the master optical connection protocol engine, generating a packet header based on the operation control signals and storing the packet header in the buffer modules of the master optical connection protocol engine, by the master optical connection protocol engine;

generating a packet sequence and a CRC based on the packet header and the operation control signals by the master optical connection protocol engine;

generating packets by connecting the packet sequence, the CRC, the packet header, and the operation control signals, by the master optical connection protocol engine; and converting the packets into serial signals and transmitting the serial signals to the first E/O converter by the master optical connection protocol engine.

17. The method as set forth in claim 16, further comprising:

receiving response signals with respect to the serial signals from the first E/O converter and converting the response signals into parallel signals by the master optical connection protocol engine;

generating packet reception information based on the parallel signals by the master optical connection protocol engine;
determining whether the parallel signals are normally received, based on the packet reception information and generating normally-received signals or reception error signals by the master optical connection protocol engine; and
converting the normally-received signals or the reception error signals into serial signals and transmitting the serial signals to the first E/O converter by the master optical connection protocol engine.

18. The method as set forth in claim 17, further comprising:
storing the packet header and the packet data included in response signals in buffer modules based on the parallel signals received from the slave optical connection protocol engine by the master optical connection engine;
detecting the stored packet header by the master optical connection protocol engine; and
detecting the packet data based on the packet header and transmitting the detected packet header and the detected packet data to the shared cache memory unit by the master optical connection protocol engine.

19. The method as set forth in claim 11, wherein the converting of the electrical signals converted by the second E/O converter into operation control signals comprises:
converting the electrical signals received from the second E/O converter into parallel signals by the slave optical connection protocol engine;
determining whether the operation control signals are normally received and redundantly received, based on the converted parallel signals by the slave optical connection protocol engine;
transmitting the operation control signals that are determined not to be redundantly received, among the normally-received operation control signals in the determination, to the memory controller by the slave optical connection protocol engine;
receiving data corresponding to the transmitted operation control signals from the memory controller and storing the received data by the slave optical connection protocol engine;
generating a packet sequence and a packet header based on the stored data by the slave optical connection protocol engine;
generating CRC based on the packet sequence, the packet header, and the data and generating response signals by the slave optical connection protocol engine; and
converting the response signals into electrical signals and transmitting the electrical signals to the second E/O converter by the slave optical connection protocol engine.

20. The method as set forth in claim 19, further comprising:
generating packet reception information based on the parallel signals received from the second E/O converter by the slave optical connection protocol engine;
checking whether the parallel signals are normally received, based on the packet reception information by the slave optical connection protocol engine;
generating retransmission request signals of the response signals if an error occurs in receiving the parallel signals in the checking of whether the parallel signals are normally received, by the slave optical connection protocol engine; and
converting the retransmission request signals into electrical signals and transmitting the electrical signals to the second E/O converter by the slave optical connection protocol engine.

* * * * *